United States Patent
Ikegami et al.

(10) Patent No.: US 6,624,905 B1
(45) Date of Patent: Sep. 23, 2003

(54) IMAGE FORMATION APPARATUS HAVING IMAGE DIRECTION DISCRIMINATION FUNCTION

(75) Inventors: Hideyuki Ikegami, Shizuoka-ken (JP); Rieko Akiba, Shizuoka-ken (JP); Shunsaku Kondo, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/401,793

(22) Filed: Sep. 22, 1999

(30) Foreign Application Priority Data

Sep. 29, 1998 (JP) .......................... 10-275473
Nov. 4, 1998 (JP) .......................... 10-327553

(51) Int. Cl.[7] ............................................. G06K 15/00
(52) U.S. Cl. .................................. 358/1.13; 358/1.5
(58) Field of Search ......................... 358/1.1, 1.13, 358/1.5, 1.2, 1.18, 537, 406, 296; 399/81, 9, 16, 17, 75, 82, 83, 85, 86, 361, 363, 371

(56) References Cited

U.S. PATENT DOCUMENTS 6,308,023 B1 * 10/2001 Nomura et al. ................ 399/81
6,473,575 B2 * 10/2002 Okawa et al. ................. 399/81

* cited by examiner

Primary Examiner—Arthur G. Evans
(74) Attorney, Agent, or Firm—Fitzpatrick, Cella, Harper & Scinto

(57) ABSTRACT

In an image formation apparatus having a function to detect a direction of an original image, in a case where an image formation mode is set by using a touch panel, a keybutton to instruct whether or not direction detection is to be performed is displayed on a setting screen of an image formation mode to which direction detection is effective, while such the key is not displayed on a setting screen of an image formation mode to which direction detection is not effective. The image formation mode to which direction detection is effective includes a mode to record images of one-face originals onto two faces of a sheet, a mode to arrange and record images of plural originals onto one sheet, a mode to perform stapling at designated corner positions of sheets, and the like.

40 Claims, 19 Drawing Sheets

IMAGE FORMATION APPARATUS HAVING IMAGE DIRECTION DISCRIMINATION FUNCTION

BACKGROUND OF THE INVENTION

1. Field of the Invention

The present invention relates to an operation method to be performed in an image formation apparatus which has a function to discriminate a direction of an image.

2. Related Background Art

Contents of an original document are represented by various patterns such as a vertically written pattern, and a horizontally written pattern, and the like. Such the various patterns include an A4-portrait horizontally written document (frequently used for horizontally written Japanese document, English document, etc.), an A4-landscape horizontally written document (frequently used for document including long sentences, document for OHP (over head projector), reduced copy from A3 document, reduced copy from B4 document, etc.), an A4-landscape central-margin horizontally written document (frequently used in a case where two A4 documents are continuously reduction copied), an A4-portrait vertically written document, and the like.

Ordinarily, in a case where such the original is read by a scanner or the like as image data, since the contents of the original are managed as one (or simplex) image data, any direction of characters represented in the original is not recognized. In this connection, a document direction discrimination apparatus has been provided to recognize the character direction, discriminate the document direction of an original image according to the recognized direction, and generate data on the basis of the discriminated direction.

An image formation apparatus which has an original direction detection function to read the original image and then determine an original image output direction according to the character direction of the read image by using the document direction discrimination apparatus has been proposed.

In such the conventional image formation apparatus, however, it is necessary to set effectiveness or ineffectiveness of the original direction detection function in a user mode or the like which is different from a copy operation setting mode. For this reason, if a user does not find existence of the original direction detection function or does not understand how to set the original direction detection function, there is some fear that the user can not use such the function even if he wishes to use it.

Further, in such the conventional image formation apparatus, since the character direction is discriminated on the premise that black characters are represented on white background of the original, there has been a problem that white characters represented on black background are erroneously detected.

Therefore, in the case where the white characters are represented on the black background, if the character direction is discriminated after negative-to-positive inversion, the above problem can be eliminated. However, in this case, it is necessary to additionally instruct the negative-to-positive inversion, thereby degrading operationability.

SUMMARY OF THE INVENTION

An object of the present invention is to provide an image formation apparatus and its control method which solved the above problem.

Another object of the present invention is to provide an image formation apparatus and its control method which can easily perform an original image direction discrimination function at any time.

Still another object of the present invention is to provide an image formation apparatus and its control method which can accurately discriminate an original image direction even if white blank characters are represented on black background of an original.

Still another object of the present invention is to provide an image formation apparatus and its control method which increased operationability of image formation in which image direction discrimination is performed.

Other objects and features of the present invention will become apparent from the following detailed description and the attached drawings.

DETAILED DESCRIPTION OF PREFERRED EMBODIMENT

Hereinafter, the embodiment of the present invention will be explained with reference to the accompanied drawings.

Figure 1:
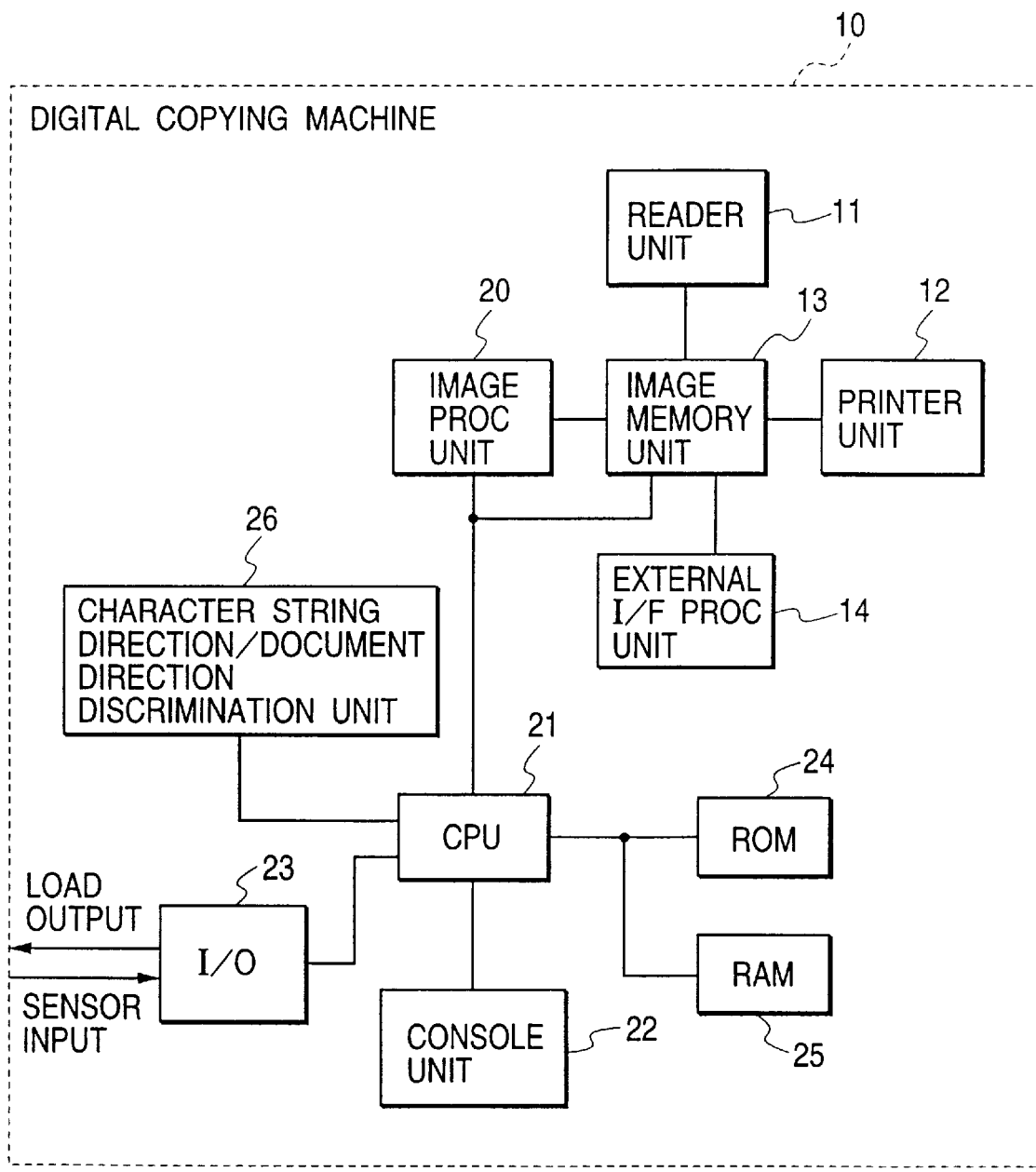
FIG. 1 is a block diagram showing a basic structure of an image formation apparatus according to the first embodiment of the present invention.

FIG. 1 is a block diagram showing a basic structure of an image formation apparatus according to the first embodiment of the present invention.

Such the image formation apparatus is structured as a digital copying machine 10. A CPU (central processing unit) 21 which performs basic controlling of the copying machine 10 is connected with a ROM (read-only memory) 24 in which a control program has been written and a working RAM (random access memory) 25 which is used to perform various processes, and an I/O (input and output) port 23, through address buses and data buses. The I/O port 23 is connected with various loads (not shown) such as a motor, a clutch and the like which control the copying machine 10, and a sensor (not shown) which detects a position of paper (or sheet).

The CPU 21 sequentially performs input/output control through the I/O port 23 in accordance with the contents of the ROM 24, thereby performing a copying operation.

Further, the CPU 21 is connected with a console unit 22 which displays a state of the copying machine 10, an image process unit 20 which processes an image converted in the form of an electrical signal by a later-described image sensor unit (108 in FIG. 4), an image memory unit 13 which accumulates the processed images, and a character string direction/document direction discrimination unit 26 which discriminates a character string direction of the image and a document direction.

The image memory unit 13 is connected with a reader unit 11 which reads the image, a printer unit 12 which performs image formation on the paper or sheet, and an external I/F (interface) process unit 14. The external I/F process unit 14 expands PDL (page description language) input from an external computer into bit map data.

Figure 2:
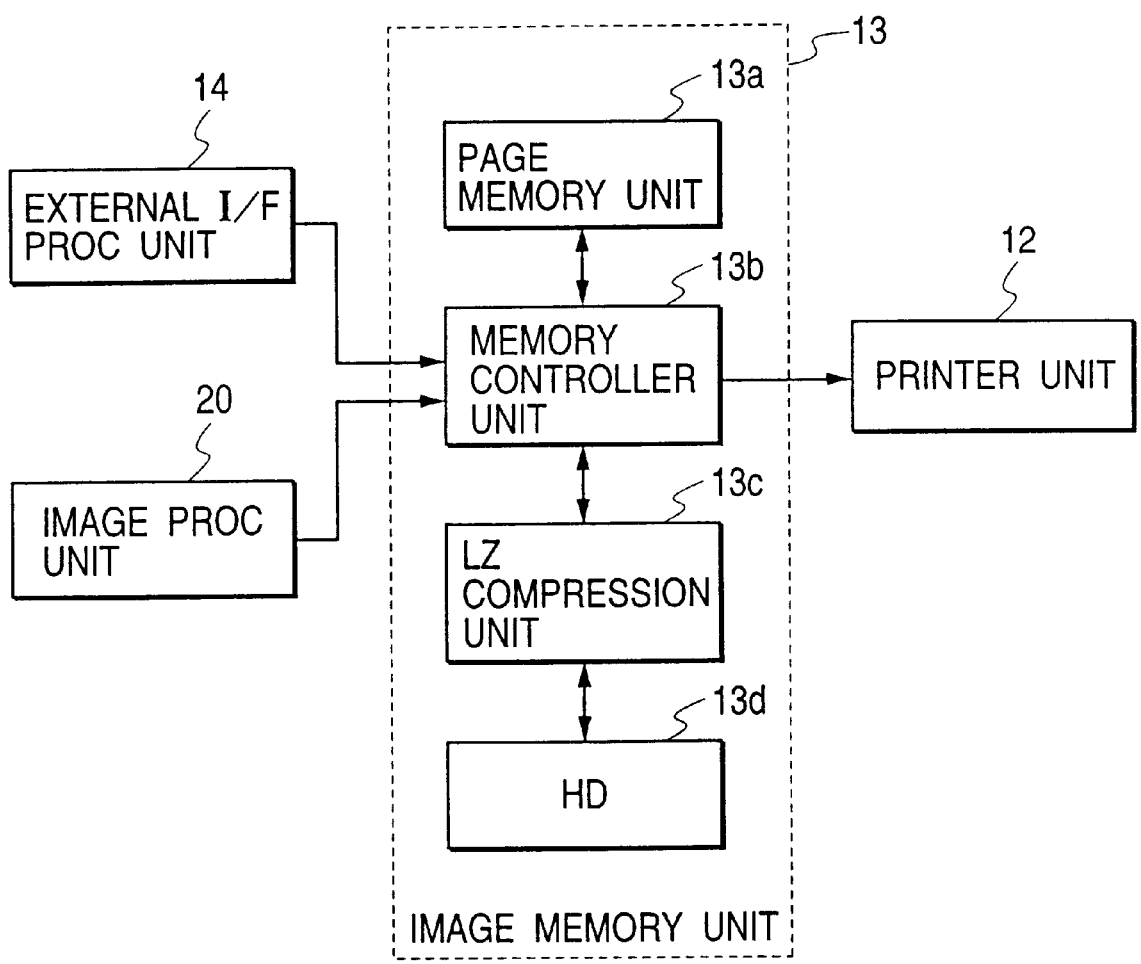
FIG. 2 is a block diagram showing details of an image memory unit 13.

FIG. 2 is a block diagram showing details of the image memory unit 13.

In the image memory unit 13, through a memory controller unit 13b, the binary images supplied from the external I/F process unit 14 and the image process unit 20 are written into a page memory unit 13a composed of a memory such as a DRAM (dynamic random access memory) or the like, the image is output to the printer unit 12, and input/output access of the image to/from an HD (hard disk) 13d being a large-capacity storage unit is performed. An LZ (Lempel-Ziv) compression unit 13c compresses and decompresses the image data in accordance with input/output of the HD 13d.

The memory controller unit 13b generates a DRAM refreshing signal for the page memory unit 13a, and also controls accessing from the external I/F process unit 14, the image process unit 20 and the HD 13d to the page memory unit 13a. Further, the memory controller unit 13b controls a writing address to the page memory unit 13a, a reading address from the unit 13a, a reading direction and the like in accordance with an instruction of the CPU 21. Thus, the CPU 21 controls a function to arrange the plural original images in the page memory unit 13a and perform layout of the arranged images (N-in-1 mode), a function to cut off and output such the images, a function to rotate the image, and the like.

Figure 3:
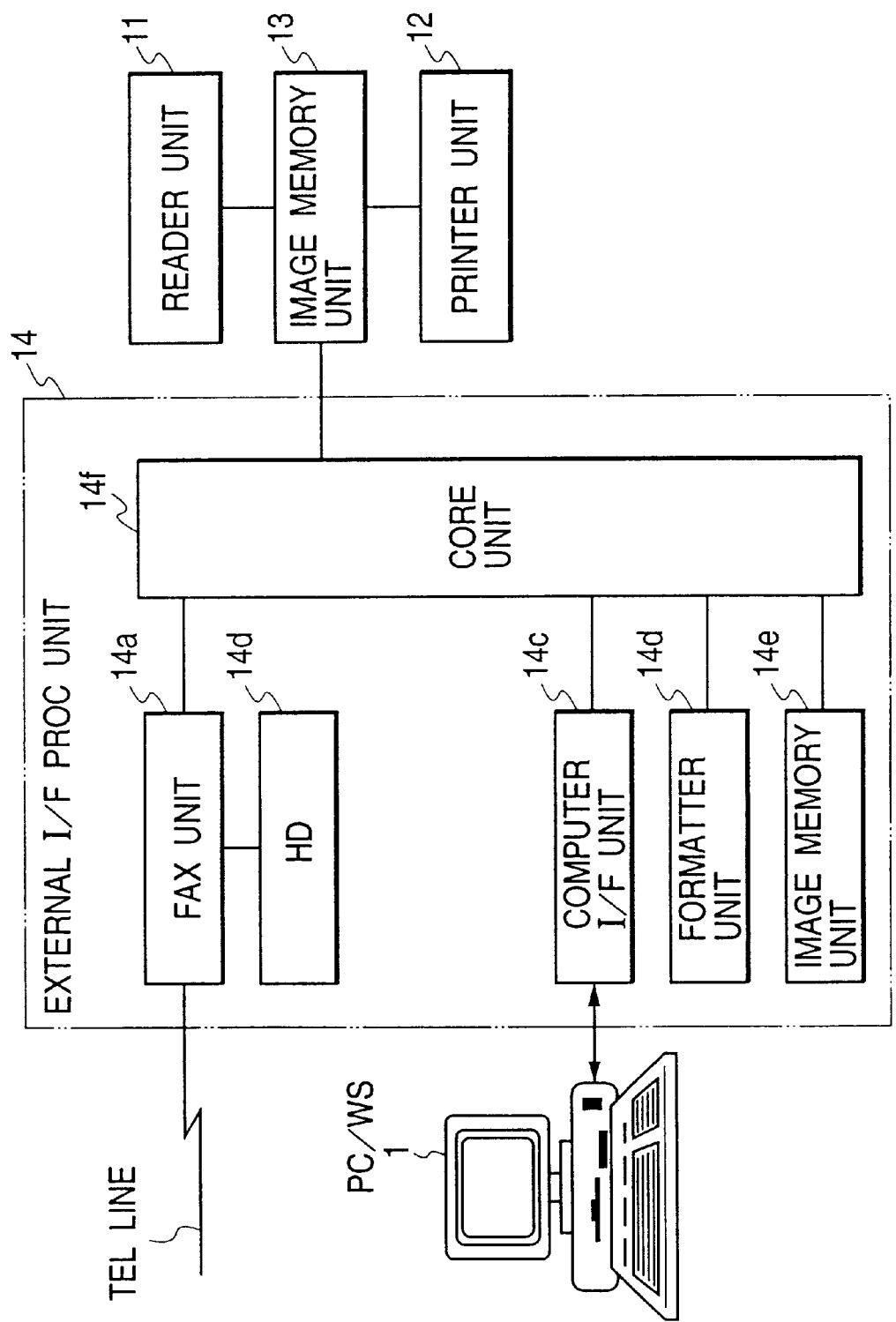
FIG. 3 is a block diagram showing a structure of an external I/F (interface) process unit 14.

FIG. 3 is a block diagram showing a structure of the external I/F process unit 14.

As described above, the external I/F process unit 14 has the function to capture the binary image data from the reader unit 11 through the image memory unit 13 and output the binary image data to the printer unit 12 through the image memory unit 13.

The external I/F process unit 14 contains a facsimile unit 14a, an HD 14b which stores communication image data of the facsimile unit 14a, a computer I/F unit 14c which connects with an external computer 1, a formatter unit 14d and an image memory unit 14e. These units 14a to 14e are all connected to a core unit 14f.

The facsimile unit 14a which is connected to a public line through a modem (not shown) receives facsimile communication data from the public line and transmits facsimile communication data to the public line. The facsimile unit 14a stores facsimile images into the HD 14b for various processes. For example, the facsimile unit 14a performs facsimile transmission at a designated time by reading the stored image from the HD 14b, or reads the stored image data from the HD 14b and transmits it in response to a communication partner's inquiry with a designated password. Thus, after the image is transferred from the reader unit 11 to the facsimile unit 14a and the HD 14b through the image memory unit 13, such the image can be subjected to the facsimile transmission without using the reader unit 11 and the image memory unit 13 as facsimile functions.

The computer I/F unit 14c which performs data communication to the external computer 1 contains a LAN (local area network), a serial interface, an SCSI (small computer system interface), a Centronics interface for printer data input, and the like. States of the printer unit 12 and the reader unit 11 are notified to the external computer 1 through the I/F unit 14c. Further, the image read by the reader unit 11 is transferred to the external computer 1 according to an instruction from the computer 1, through the I/F unit 14c.

Further, the computer I/F unit 14c receives printing data from the external computer 1. Since the printing data sent from the computer 1 through the computer I/F unit 14c has been described by dedicated printer codes, the formatter unit 14d converts these codes into raster image data to perform the image formation by the printer unit 12.

The formatter unit 14d expands the raster image data to the image memory unit 14e. As above, the unit 14e is used as the memory when the formatter unit 14d expands the raster image data. Further, the image memory unit 14e is used when the image from the reader unit 11 is sent to the external computer 1 through the computer I/F unit 14c (i.e., when image scanner function is performed). Namely, the image data sent from the image memory unit 13 is once expanded in the image memory unit 14e, the expanded data is converted into the data of which form is suitable to be sent to the external computer 1, and the converted data is then sent to the computer 1 from the computer I/F unit 14c.

The core unit 14f controls and manages data transfer between the external I/F process unit 14 (including facsimile unit 14a, computer I/F unit 14c, formatter unit 14d and image memory unit 14e) and the image memory unit 13. Thus, even if the external I/F process unit 14 has plural image output units and one image transfer path to the image memory unit 13, various exclusive control, priority control and the like are performed by the core unit 14f to adequately output the images.

Figure 4:
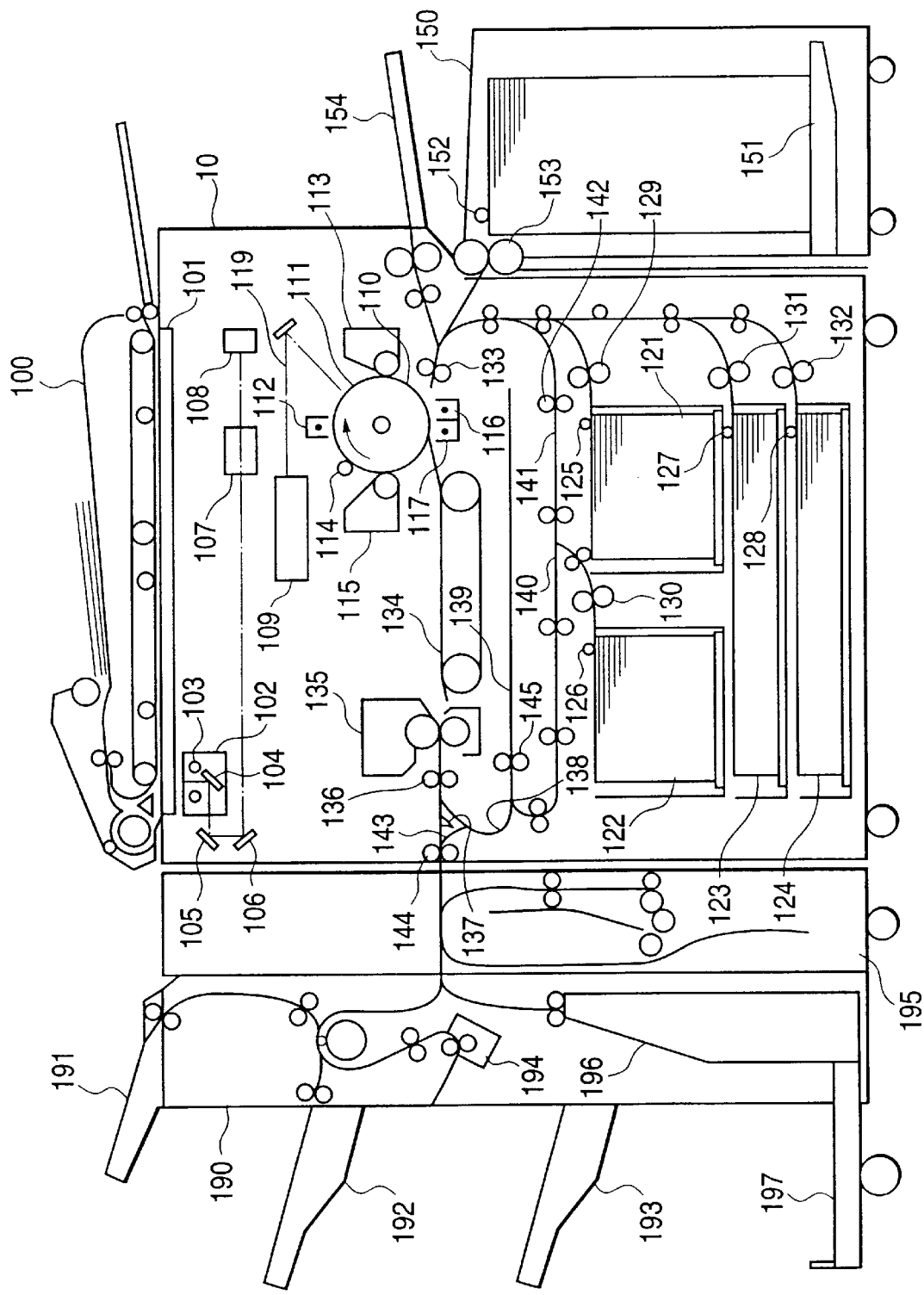
FIG. 4 is a structural sectional view showing an example of a digital copying machine 10 according to the embodiment.

FIG. 4 is a structural sectional view showing an example of the digital copying machine 10.

An automatic document feeder 100 is mounted on a platen glass 101 provided at the upper end of the body of the digital copying machine 10. The platen glass 101 is the board on which the original is placed. A scanner 102 which is composed of an original illumination lamp 103, a scanning mirror 104 and the like is reciprocated by a not-shown motor in a predetermined direction below the platen glass 101 to scan the original on the glass 101. Reflection light from the original is guided into a CCD (charge-coupled device) sensor in an image sensor unit 108 through scanning mirrors 104 to 106 and a lens 107.

An exposure control unit 109 which is composed of a laser, a polygonal scanner and the like irradiates a laser beam 119 onto a photosensitive drum 111. In this case, the laser beam 119 has been modulated on the basis of an image signal converted and subjected to a predetermined image process by the image sensor unit 108. A primary charger 112, a development unit 113, a transfer charger 116, a preexposure lamp 114 and a cleaning unit 115 are provided around the photosensitive drum 111.

In such an image formation unit 110, the photosensitive drum 111 is driven by a not-shown motor in a direction indicated by an arrow. After the photosensitive drum 111 is charged by the primary charger 112 to have desired potential, the drum 111 is irradiated by the laser beam 119 sent from the exposure control unit 109, whereby an electrostatic latent image is formed on the drum 111. Then the electrostatic latent image is developed by the development unit 113 and thus visualized as a toner image.

A transfer paper sheet (referred as transfer sheet hereinafter) which is supplied from a right cassette deck 121, a left cassette deck 122, an upper cassette 123 or a lower cassette 124 by a pickup roller 125, 126, 127 or 128 is further carried by a sheet feed roller 129, 130, 131 or 132. After then, the sheet is fed to a transfer belt 134 by a registration roller 133, and the visualized toner image is transferred onto the sheet by the transfer charger 116.

After the toner image is transferred onto the sheet, residual toner on the photosensitive drum 111 is cleaned off by the cleaning unit 115, and residual charges are erased by the preexposure lamp 114. Then the transfer sheet is separated from the drum 111 by a separation charger 117 and carried to a fixing unit 135 by the transfer belt 134. The toner on the transfer sheet is pressed and heated by the fixing unit 135 to be fixed to the sheet. Then the transfer sheet is discharged outside the body of the copying machine 10 by a discharge roller 136.

In the body of the copying machine 10, a deck 150 capable of holding, e.g., 4000 transfer sheets is installed. A lifter 151 of the deck 150 is lifted according to a quantity of transfer sheets such that the sheets are always in contact with a pickup roller 152. Thus, the transfer sheet which was fed by the pickup roller 152 is carried to the body of the copying machine 10 by a sheet feed roller 153. Further, a multipurpose manual feeder 154 capable of holding 100 sheets is installed in the body.

A sheet discharge flapper 137 changes a path between the side of a carrying path 138 and the side of a discharge path 143. The transfer sheet sent from the discharge roller 136 is reversed or turned through an inversion path 139, and the sheet is then carried to a sheet refeed path 141 through a lower carrying path 140. Also, the transfer sheet which was fed from the left cassette deck 122 by the sheet feed roller 130 is carried to the sheet refeed path 141.

A sheet refeed roller 142 refeeds the transfer sheet to the image formation unit 110. A discharge roller 144 is arranged in the vicinity of the sheet discharge flapper 137. Thus, the path is changed to the discharge path 143 by the sheet discharge flapper 137, and the transfer sheet is discharged outward the body of the copying machine 10 by the discharge roller 144 through the changed path 143.

In two-face recording (i.e., two-face copying), the sheet discharge flapper 137 is lifted off to guide the copy-ended transfer sheet to the sheet refeed path 141 through the carrying path 138, the inversion path 139 and the lower carrying path 140. At this time, an inversion roller 145 is driven to carry the transfer sheet to the position on the inversion path 139 where the trailing edge of the sheet has completely passed the carrying path 138 and the sheet is being nipped by the roller 145, and the roller 145 is then inverted to carry the sheet to the carrying path 140.

On the other hand, when the transfer sheet is inverted and discharged outward the body of the copying machine 10, the sheet discharge flapper 137 is lifted off. Then the inversion roller 145 is driven to carry the transfer sheet to the position on the inversion path 139 where the trailing edge of the sheet remains being on the carrying path 138, and the roller 145 is inverted to reverse and carry the sheet to the side of the discharge roller 144.

A sheet discharge process apparatus 190 stacks and aligns the transfer sheets discharged from the body of the copying machine 10 one by one, by using a process tray 194. After discharging of the image-formed transfer sheets of one group ends, a sheaf of discharged sheets is stapled and discharged onto a sheet discharge tray 192 or 193. The sheet discharge tray 193 is moved upward and downward by a not-shown motor such that the tray 193 reaches the position of the process tray before the image process operation starts. A sheet tray 191 loads with segmentation sheets each of which is to be inserted between the discharged sheets. A Z folder 195 folds the discharged sheets into a Z shape. A binder 196 performs binding by collectively center-folding and stapling the group of discharged transfer sheets. The sheaf of sheets bound by the finer 196 is discharged onto a discharge tray 197.

Figure 5:
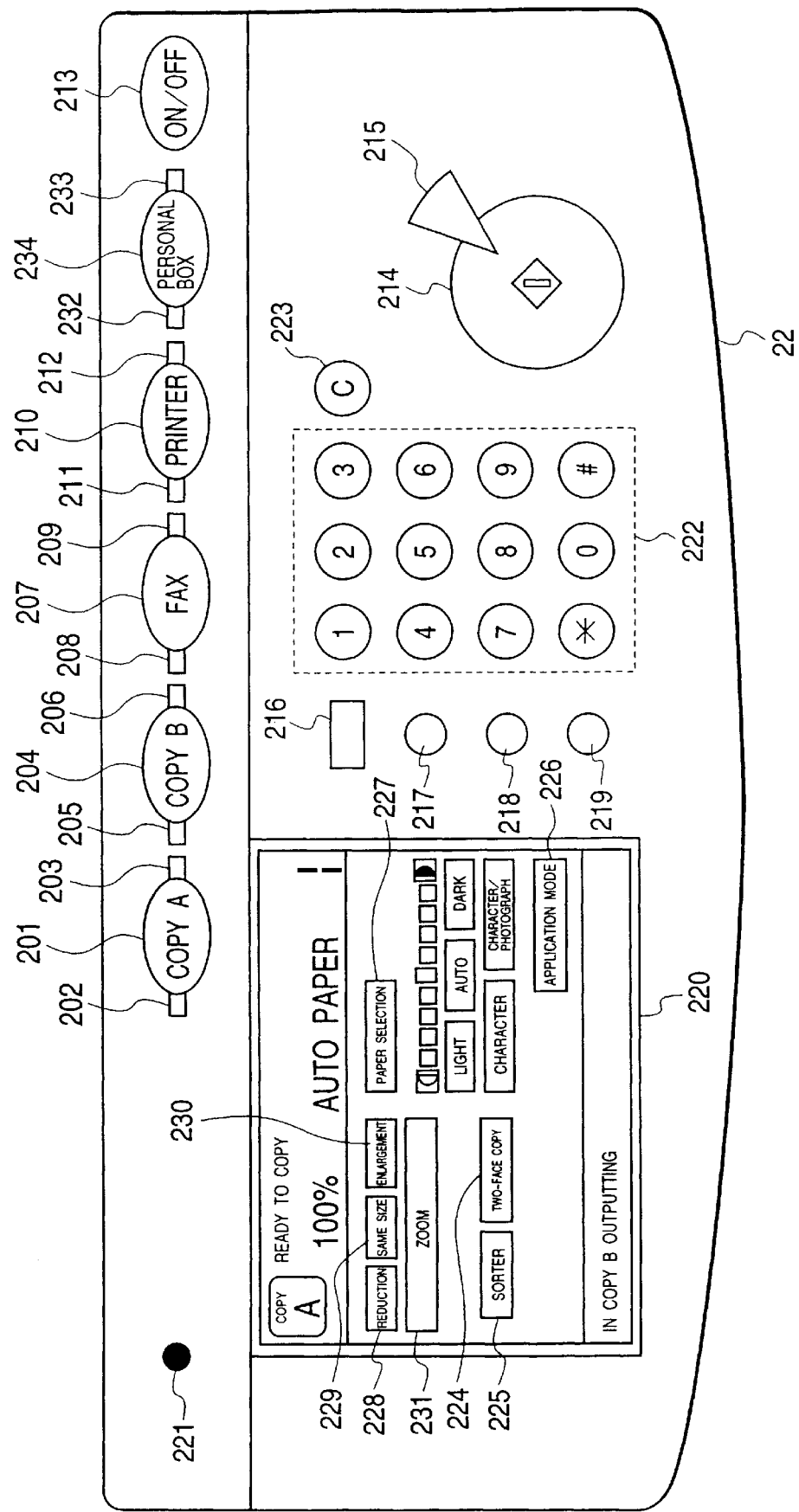
FIG. 5 is a view showing appearance of a console unit 22 shown in FIG. 1.

FIG. 5 is a view showing appearance of the console unit 22 shown in FIG. 1.

In the drawing, keybuttons 201 to 212 and 234 and an LED (light emitting diode) display are provided to change the displayed contents of the console unit 22, so as to set various functions concerning copying and system operations of the copying machine 10. The keybuttons 201, 204, 207, 210 and 234 which are used to change the various functions are semitransparent keybuttons which contain not-shown display lamps such as LED's respectively. If an operation screen is selected by depressing the keybutton, the lamp within the depressed keybutton is lighted. Namely, only the lamp within the keybutton corresponding to the currently selected operation function screen is controlled to light, and the lamps within the other keybuttons are controlled not to light.

The green LED lamps 203, 206, 209, 212 and 233 are arranged respectively at the right of the keybuttons 201, 204, 207, 210 and 234. Each lamp indicates an operation condition of each function by lighting the LED. For example, the LED lamp 206 for a copy B function is controlled not to light when the copy B function is on standby, and controlled to flash when the copy B function is performing the output operation. Further, the lamp 206 is controlled to light when an image of the copy B function has been stored in the HD 13d of the image memory unit 13 and the printing operation for the copy B function is not performed. Similarly, for example, the LED lamp 209 for a facsimile function is controlled to flash during a communication operation, the printing operation and a reading operation, and controlled to light when a facsimile image has been stored in the HD 14d of the facsimile unit 14a.

The red LED lamps 202, 205, 208, 211 and 232 are arranged respectively at the left of the keybuttons 201, 204, 207, 210 and 234. Each lamp indicates that an abnormal condition occurs in each function, by lighting the LED. For example, the LED lamp 205 for a copy B function is controlled to flash when abnormality such as an interruption due to no sheet, a sheet jam or the like occurs in the copy B function. At this time, if a user depresses the copy B function keybutton 204 to change the displayed contents on the console unit 22 to the copy B display, the condition of the copy B function is displayed on a display panel 220, whereby he can confirm the details of the abnormal condition.

Irrespective of the operation condition of each function, the function change keybuttons 201, 204, 207, 210 and 234 can be depressed at any time to change the function of the console unit 22. As in the present embodiment, if the copy A function and the copy B function can be changed to each other, the keybuttons (later-described start keybutton 214, stop keybutton 215, reset keybutton 216, etc.) other than the keybuttons within the display panel 220 are operated to the functions selected by the function change keybuttons 201 and 204. For example, in the case where the copy B function is performing the output operation, while a copy A function operation screen is being displayed, even if the stop keybutton 215 is depressed, it is impossible to stop the copying operation of the copy B function. Namely, if the stop keybutton 215 is depressed after the copy B function keybutton 204 is depressed, it is possible to stop the copying operation of the copy B function.

The data set by a user setting keybutton 218 is effective on the copy A function screen and the copy B function screen respectively. Namely, the user can independently perform setting in each screen by using the keybutton 218.

In accordance with power on and off operations by a power keybutton 213, a lamp 221 is turned on and off. A ten-keybutton 222 is used to set the number of copies (i.e., image formation) and to input numerical values for the mode setting. A clear keybutton 223 is used to clear the setting input by the ten-keybutton 222. The reset keybutton 216 is used to reset the set number of copies, the set operation mode, the selected sheet feeder and the like.

When the start keybutton 214 is depressed, the image formation operation starts. An LED lamp (not shown) which indicates whether or not the operation can start is provided in the center of the start keybutton 214. Thus, when the operation can not start, or while the apparatus is in the operation, the red LED lamp lights. On the other hand, when the operation can start, the greed LED lamp lights. The stop keybutton 215 is used to stop the copying operation.

If a guide keybutton 217 is depressed and then another keybutton is depressed, the explanation of the function capable of being set by such the keybutton is displayed on the display panel 220. If the guide keybutton 217 is again depressed, such the guide display is released. If the user setting keybutton 218 is depressed, it is possible to change user's setting of the body of the copying machine 10. For example, the user can change the time until the setting is automatically released, initial (or default) values of the mode when the reset keybutton 216 is depressed, and the like.

When an interruption keybutton 219 is depressed during the image formation operation, such the image formation operation is stopped, and another copying operation can be performed without using the automatic document feeder 100.

The display panel 220 which includes a liquid crystal display and the like changes its display according to the set mode, so as to ease detailed mode setting. A touch sensor is provided on the surface of the display panel 220. In FIG. 5, keybuttons 224 to 231 are displayed on the panel 220. If the user touches the keybutton-displayed position, it is considered that the corresponding keybutton is depressed, thereby setting the corresponding mode. Numeral 227 denotes a sheet selection keybutton, numerals 228 to 231 denotes copy magnifying power setting keybuttons, and numeral 226 denotes an application mode setting keybutton. If the keybutton 226 id depressed, a screen for setting application function modes (e.g., pamphlet mode, a cover composition mode, etc.), a reduction layout mode and an enlargement layout mode and setting keybuttons for the application function modes are displayed, thereby enabling the user to perform the setting in an application mode. In this case, it should be noted that the pamphlet mode is to perform the printing in the order suitable for forming a pamphlet, and the cover composition mode is to insert a cover sheet into the printing sheets.

Hereinafter, setting operations of the various modes of the digital copying machine according to the present embodiment will be explained concretely.

[Setting Operation of One-face Original→Two-face Printing]

Initially, the setting operation of one-face original→two-face printing will be explained with reference to FIGS. 6, 7, 8, 9A, 9B, 9C and 10. In the present embodiment, the term "two-face printing" represents that images are printed on the front and back faces of the sheet or the like, and the term "one-face original→two-face printing" represents that in the two-face printing the images on one face of each of the two originals are printed on the front and back faces of the sheet.

Figure 6:
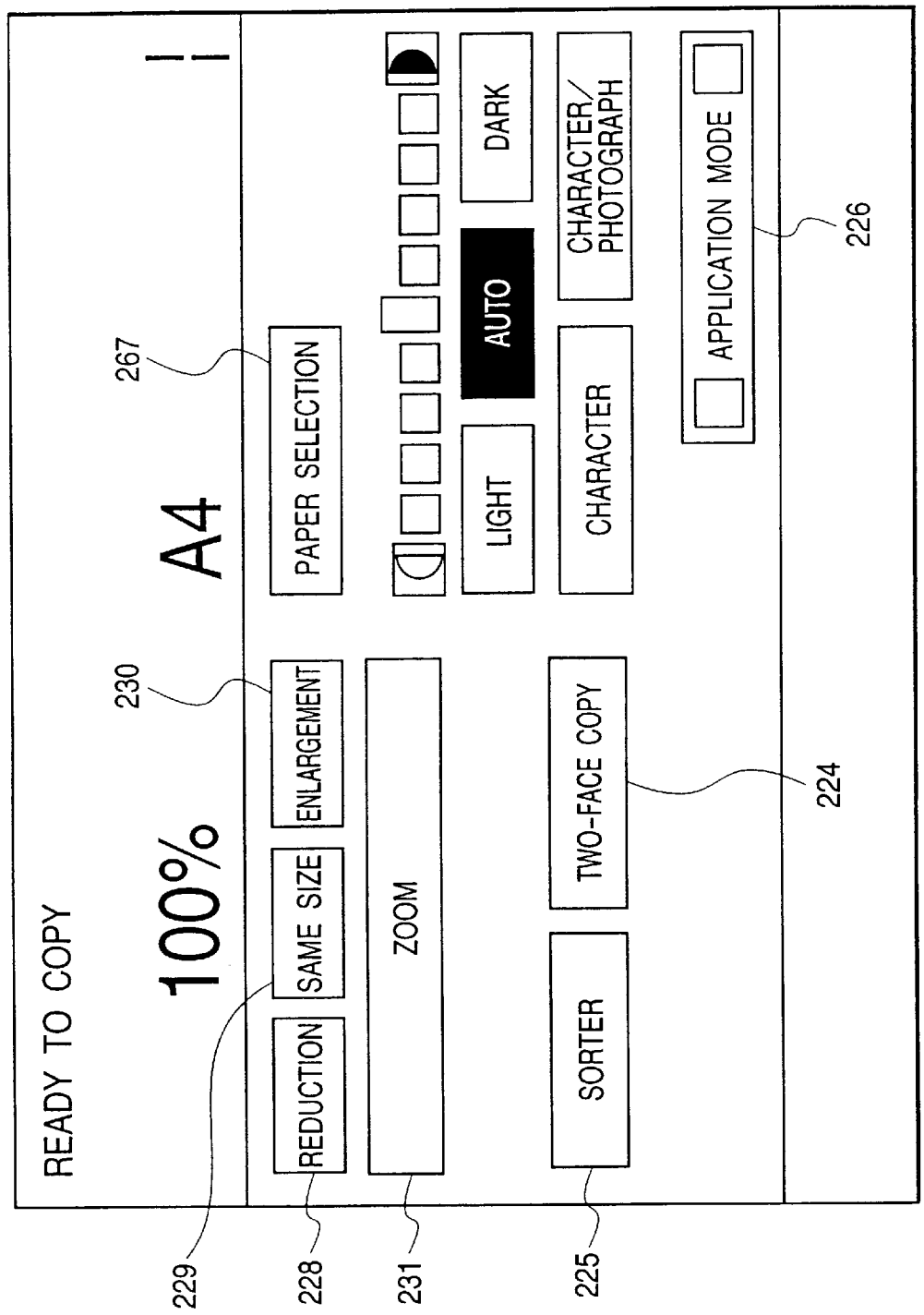
FIG. 6 is a view showing a basic screen of a display panel 220.
Figure 7:
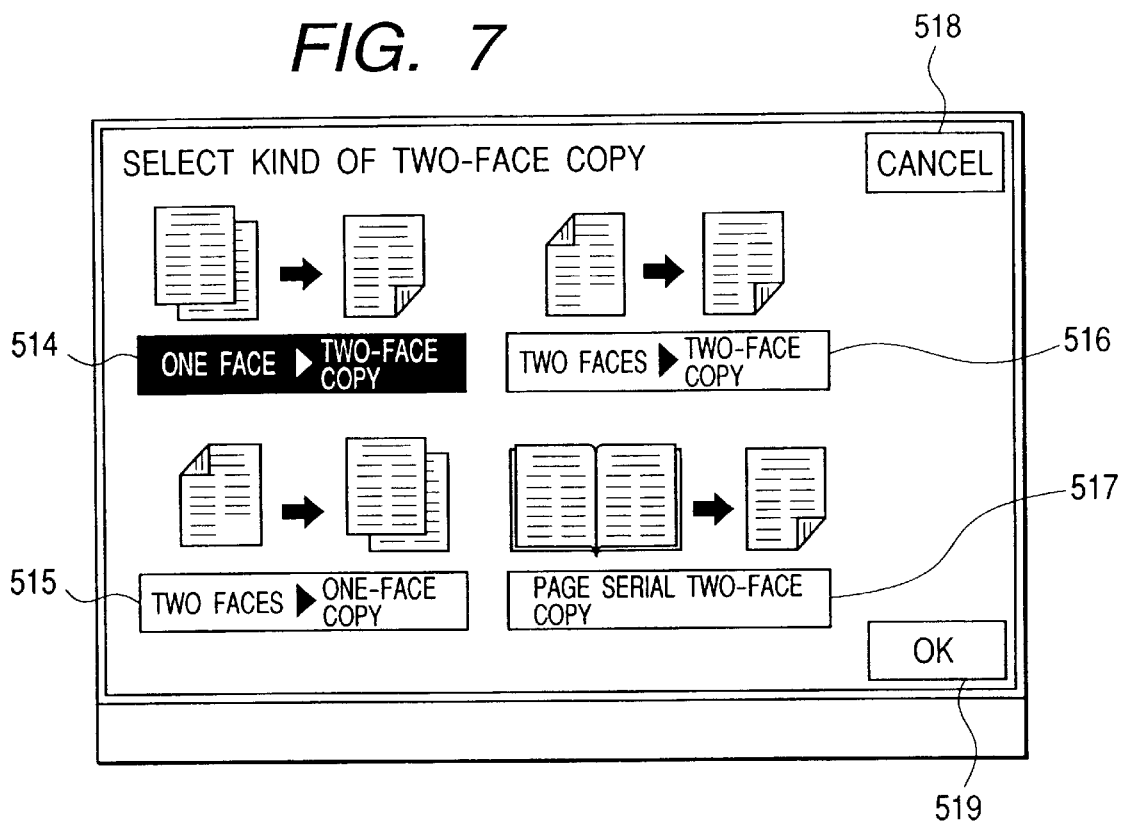
FIG. 7 is a view showing a two face mode setting screen.

FIG. 6 is a view showing a basic screen of the display panel 220. On the basic screen, if the two-face printing keybutton 224 is depressed, a two face mode setting screen shown in FIG. 7 is displayed. In the two face mode setting screen, for example, if a one-face original→two-face printing keybutton 514 is depressed, the keybutton 514 is black-and-white inverted to set a selectable state. Then if an OK keybutton 419 is depressed, a screen (i.e., two-face print mode setting screen) shown in FIG. 8 for setting a manner of double spread in after the one-face original→two-face printing is finished is displayed to select right-and-left double spread or top-and-bottom double spread. If a page serial copy keybutton 517 and then the OK keybutton 519 are depressed, a setting screen (not show) to select the right-and-left double spread or the top-and-bottom double spread. On the other hand, even if a two-face original→one-face printing keybutton 515 or a two-face original→two-face printing keybutton 516 is depressed and then the OK keybutton 519 is depressed, any further setting screen is not displayed, but a standard screen shown in FIG. 10 is displayed.

Figure 9A:
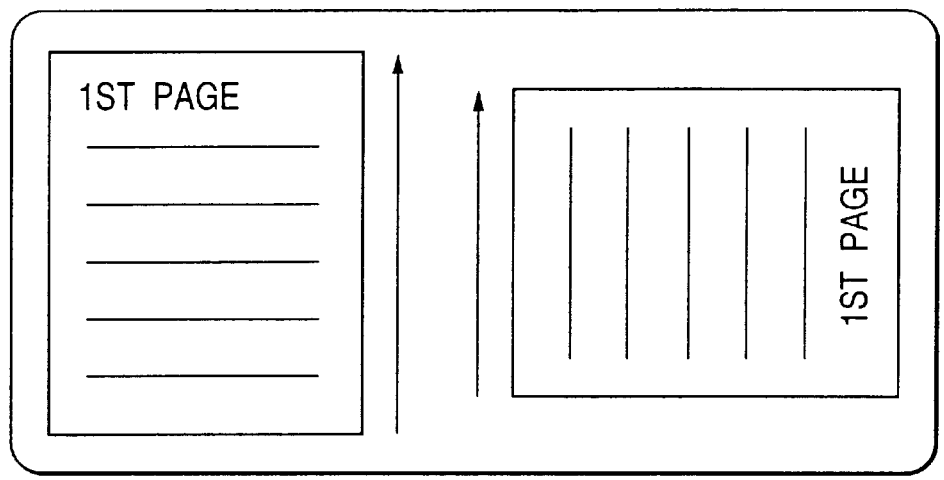
FIGS. 9A, 9B and 9C are views showing recording states of right-and-left double spread and top-and-bottom double spread respectively corresponding to document directions.
Figure 9B:
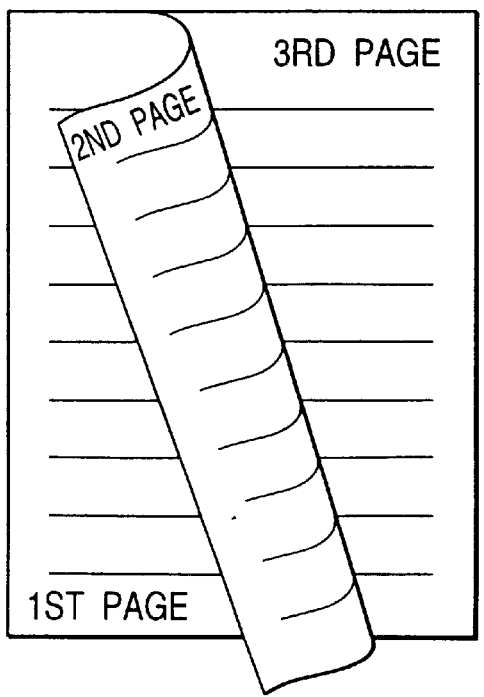
Figure 9C:
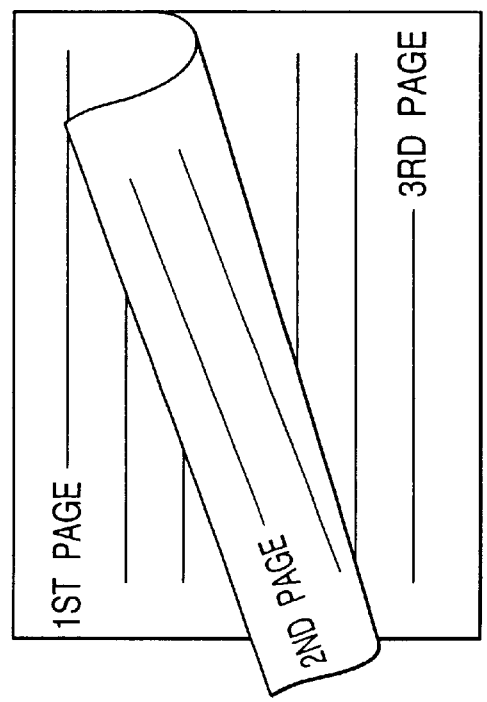

In the present embodiment, document directions are defined as shown in FIG. 9A. The right-and-left double spread represents such a state (e.g., book) as shown in FIG. 9B, and the top-and-bottom double spread represents such a state (e.g., calendar) as shown in FIG. 9C.

If a right-and-left double spread setting keybutton 520 is depressed, the keybutton 520 is black-and-white inverted to set a state that right-and-left double spread finish is selectable. Similarly, if a top-and-bottom double spread setting keybutton 521 is depressed, the keybutton 521 is black-and-white inverted (not shown) to set a state that top-and-bottom double spread finish is selectable. In case of stopping the one-face original→two-face printing, a cancel keybutton 522 is depressed, whereby the two face mode setting screen shown in FIG. 7 is again displayed.

Figure 8:
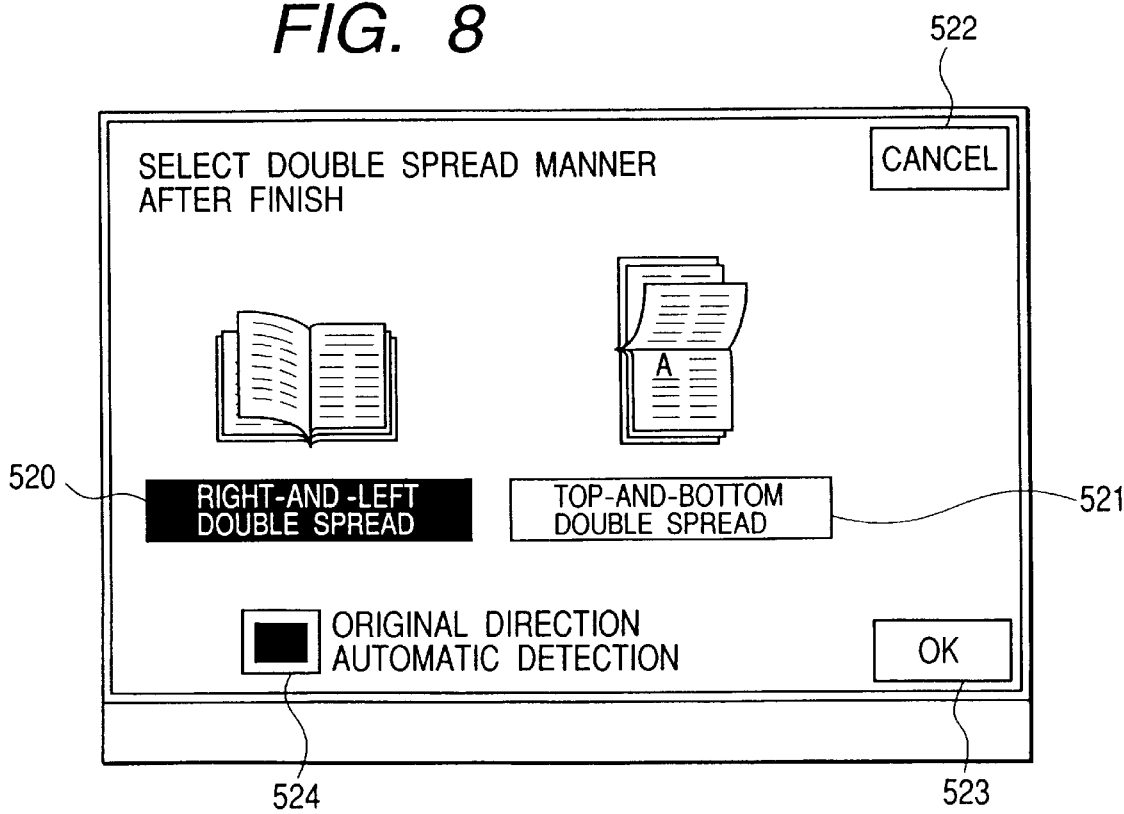
FIG. 8 is a view showing a two-face print mode setting screen.
Figure 10:
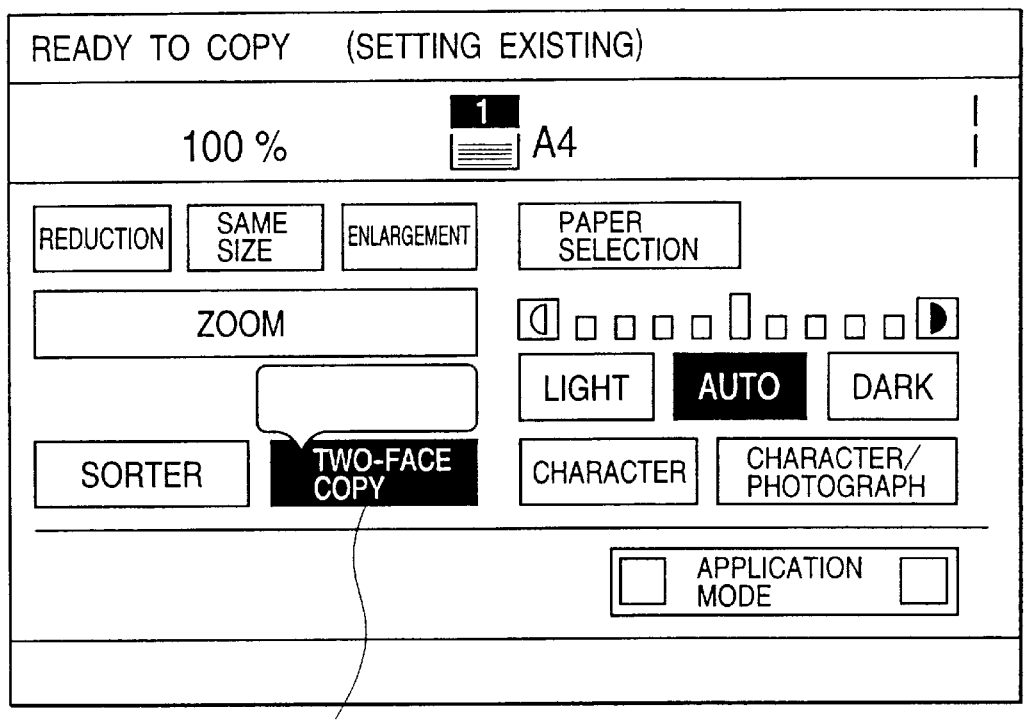
FIG. 10 is a view showing a screen on which two-face printing has been set.

On the two-face print mode setting screen shown in FIG. 8, if either of the keybuttons 520 and 521 is selected and an OK keybutton 523 is depressed, the two-face printing keybutton 224 is black-and-white inverted as shown in FIG. 10, and the screen on which the two-face printing has been set is displayed. At this time, if the start keybutton 214 is depressed, the copying operation starts.

Further, on the screen of FIG. 8, if a keybutton 524 is depressed, it is possible to select whether or not the original direction is automatically detected. That is, if the keybutton 524 is depressed and thus black-and-white inverted, it is set to detect the original direction. If the keybutton 524 is again depressed in the inverted state, such the inverted state is released, whereby it is set not to detect the original direction.

[Setting Operation in Case of Selecting Reduction Layout]

Subsequently, an operation flow in a case where the reduction layout mode (N-in-1 mode) is selected on the application screen shown in FIG. 11 will be explained in detail.

Figure 11:
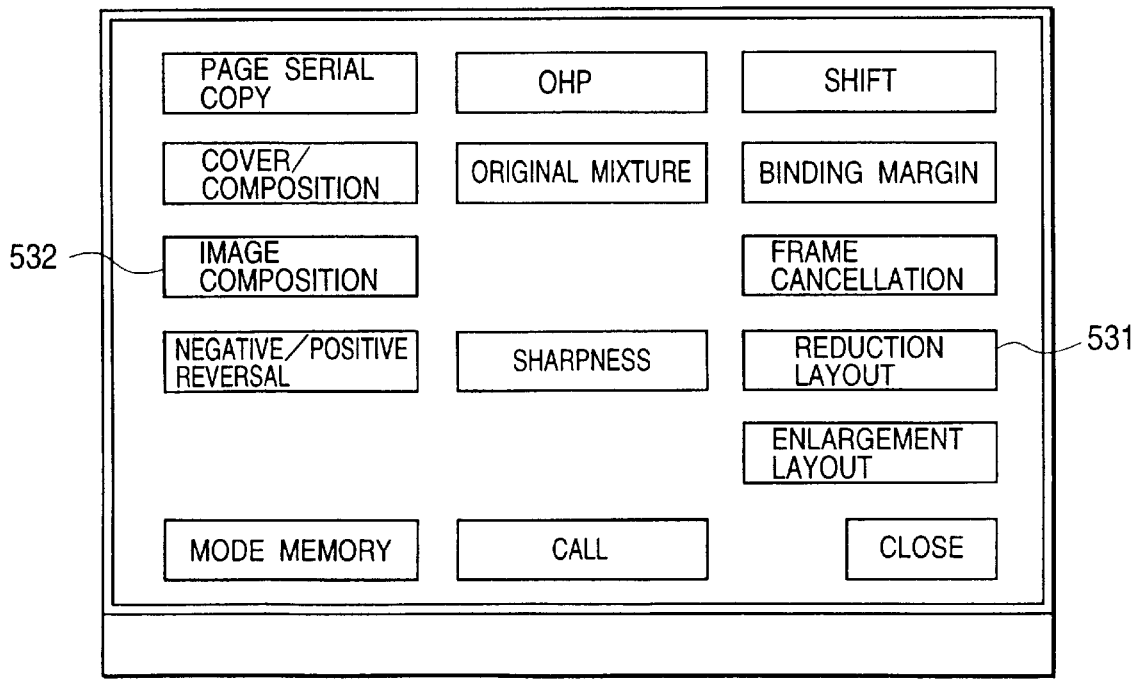
FIG. 11 is a view showing an application screen.
Figure 12:
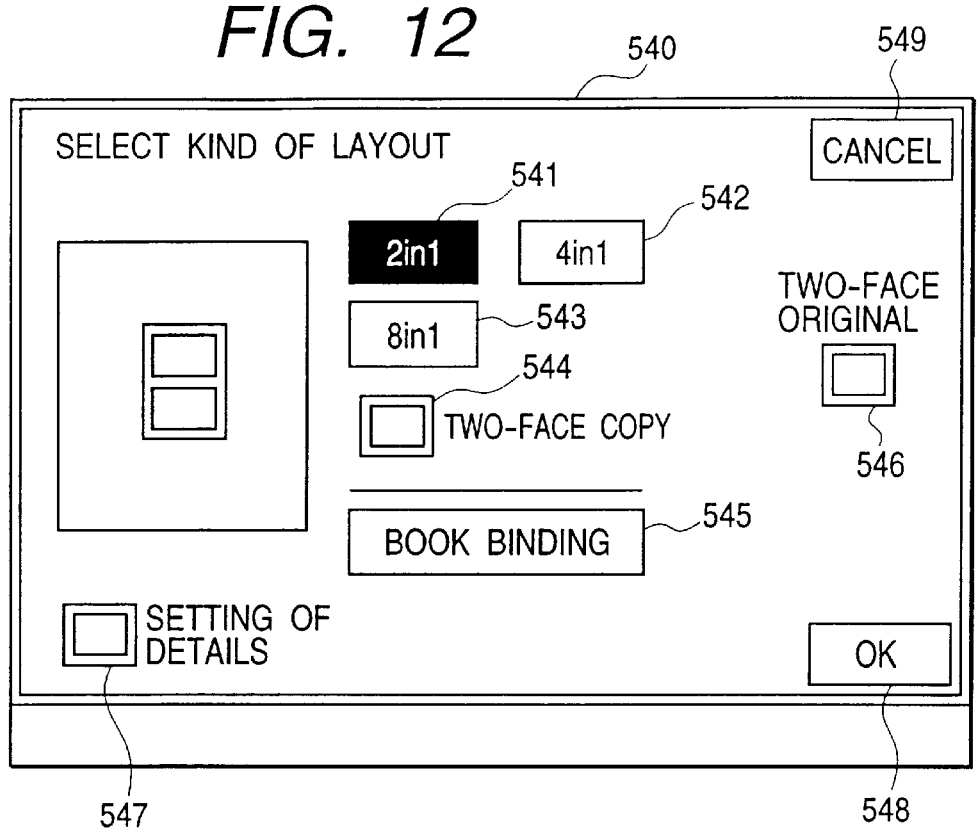
FIG. 12 is a view showing a layout selection screen.

On the screen of FIG. 11, if the reduction layout mode is selected by depressing a keybutton 531, an original size selection screen (not shown) is displayed. If an original size is set on this screen, a layout selection screen 540 for selecting a kind of layout is displayed as shown in FIG. 12. A 2-in-1 keybutton 541, a 4-in-1 keybutton 542 and an 8-in-1 keybutton 543 are used to select the kind of layout.

If the 2-in-1 keybutton 541 is depressed, the setting is performed such that images of two pages of the read original are automatically size-reduced and formed (or copied) on the selected sheet and the sheet is then output. If the 4-in-1 keybutton 542 is depressed, the setting is performed such that images of four pages of the read original are automatically size-reduced and formed (or copied) on the selected sheet and the sheet is then output. If the 8-in-1 keybutton 543 is depressed, the setting is performed such that images of eight pages of the read original are automatically size-reduced and formed (or copied) on the selected sheet and the sheet is then output.

Figure 13:
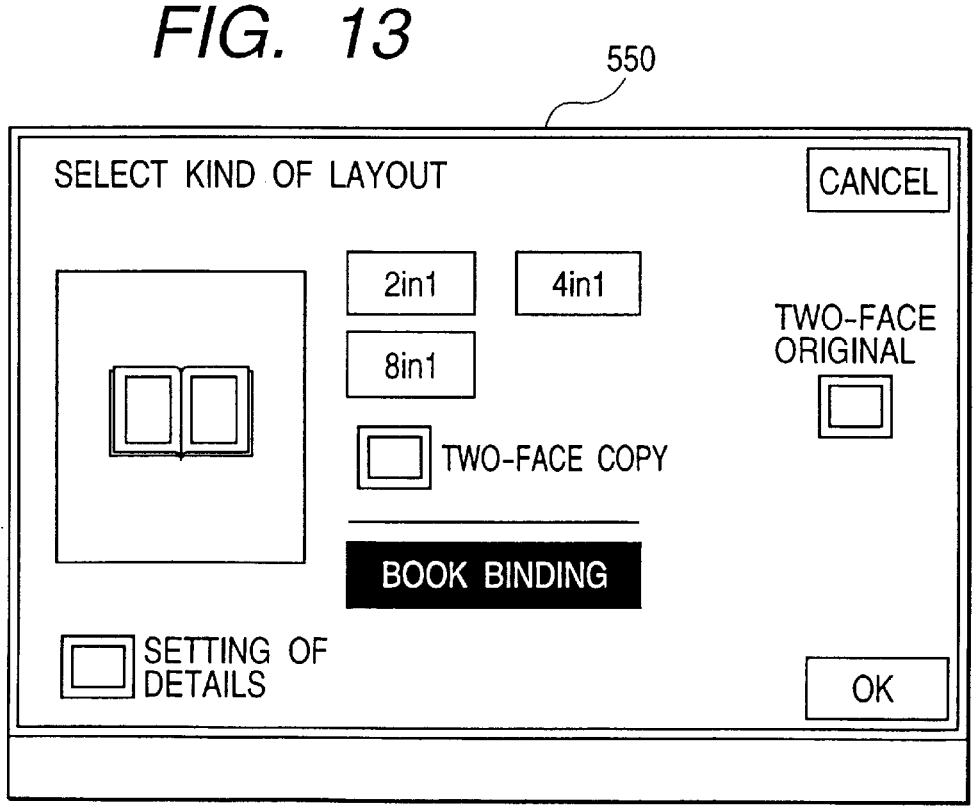
FIG. 13 is a view showing a screen displayed in a case where book binding is selected on the layout selection screen.

A two-face original keybutton 546 is used to read the two-face original. Namely, if the keybutton 546 is depressed, the automatic document feeder 100 can scan the front and back faces of the original. If a two face keybutton 544 is depressed, the two face outputting is performed. If a book binding keybutton 545 which is to set the pamphlet mode is depressed, the outputting is performed in the pamphlet mode. If a cancel keybutton 549 which is to cancel the reduction layout mode is depressed, the application screen shown in FIG. 11 is again displayed. If the book binding keybutton 545 is depressed on the screen 504 of FIG. 12, a detail setting keybutton 547 is displayed as shown in FIG. 13, whereby the setting of the keybutton 547 is inhibited.

Figure 14:
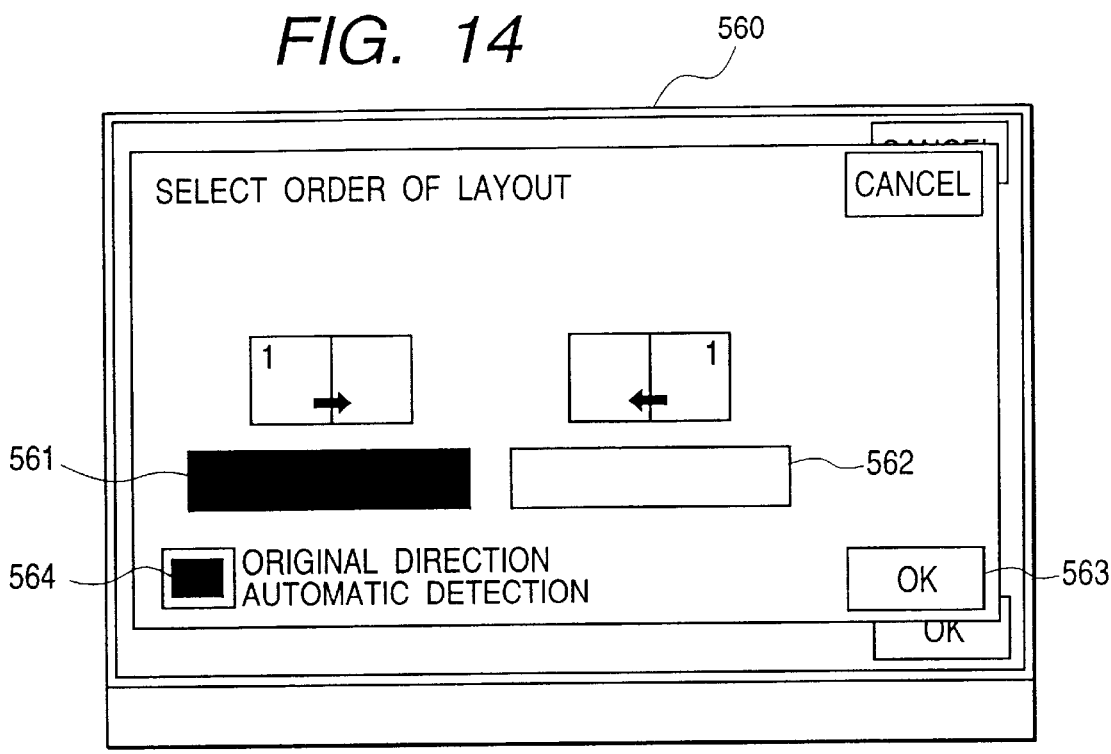
FIG. 14 is a view showing a 2-in-1 layout order setting screen.

On the screen 540 of FIG. 12, if the 2-in-1 keybutton 541 is selected, and if the detail setting keybutton 547 is depressed in the state that the book binding keybutton 545 is not depressed, a 2-in-1 layout order setting screen 560 shown in FIG. 14 is displayed.

On the screen 560, keybuttons 561 and 562 are used to select what order the read images are formed on the sheet.

Namely, if the keybutton 561 is depressed and then a reading OK keybutton 563 is depressed, the selected layout order is set. Then the layout selection screen (or reduction layout kind selection screen) 540 shown in FIG. 12 is again displayed. In this state, if an OK keybutton 548 is depressed to select the output sheet and then the start keybutton 214 is depressed, the reduction layout outputting is performed with the set layout kind and in the set layout order.

Figure 15:
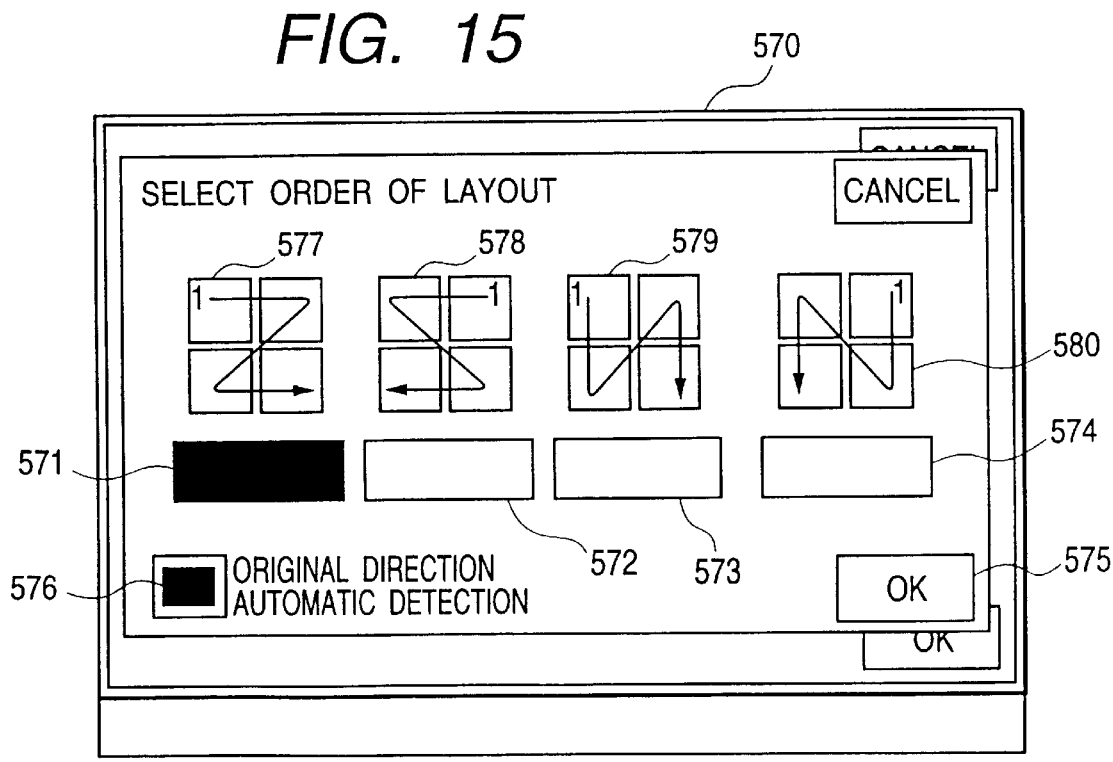
FIG. 15 is a view showing an N-in-1 layout order setting screen.

On the reduction layout kind selection screen 540 of FIG. 12, if the detail setting keybutton 547 is depressed in the state that the 4-in-1 keybutton 542 or the 8-in-1 keybutton 543 is being selected, an N-in-1 layout order selection screen 570 shown in FIG. 15 is displayed.

On the screen 570, four kinds of layout order can be selected by using keybuttons 571 to 574 respectively. For example, when four originals are read and layout is performed, if the keybutton 571 is selected, such the layout as ordering the first page of the original at the upper left, the second page at the upper right, the third page at the lower left and the fourth page at the lower right is performed (such layout is called as Z-type reduction layout). If the keybutton 572 is selected, such the layout as ordering the first page of the original at the upper right, the second page at the upper left, the third page at the lower right and the fourth page at the lower left is performed (such layout is called as opposite Z-type reduction layout). If the keybutton 573 is selected, such the layout as ordering the first page of the original at the upper left, the second page at the lower left, the third page at the upper right and the fourth page at the lower right is performed (such layout is called as opposite N-type reduction layout). If the keybutton 574 is selected, such the layout as ordering the first page of the original at the upper right, the second page at the lower right, the third page at the upper left and the fourth page at the lower left is performed (such layout is called as N-type reduction layout).

If a keybutton 576 is depressed, it is possible to select whether or not the automatic detection of the original direction is to be performed. Namely, if the keybutton 576 is depressed and thus black-and-white inverted, it is set to perform the automatic detection of the original direction. If the keybutton 576 is again depressed in the inverted state, such the inverted state is released, whereby it is set not to perform the automatic detection. It should be noted that the automatic detection of the original direction is performed in a known method.

If an OK keybutton 575 is depressed, the selected layout order is set, and the reduction layout kind selection screen 540 of FIG. 12 is again displayed. On the screen 540, if the OK keybutton 548 is depressed to select the output sheet and then the start keybutton 214 is depressed, the reduction layout outputting is performed with the set layout kind and in the set layout order.

[Function of Sort Keybutton]

Figure 16:
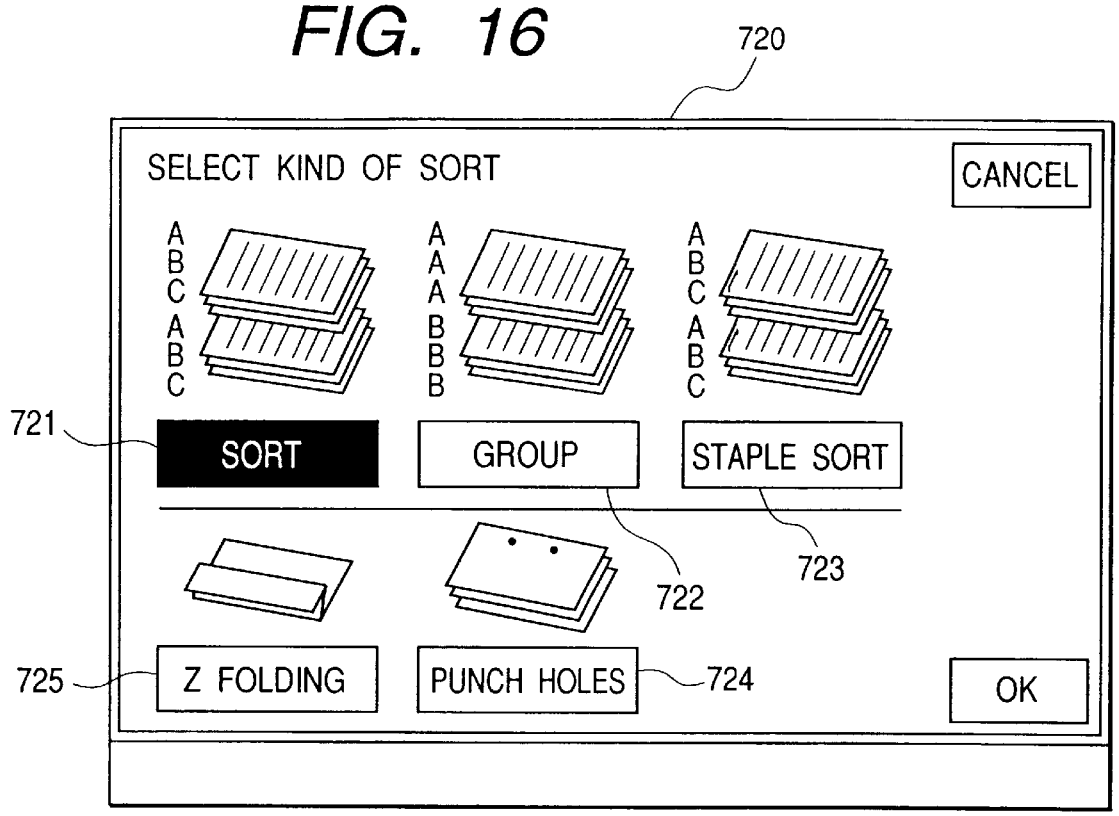
FIG. 16 is a view showing a paper discharge process selection screen.

Subsequently, the sort keybutton 225 on the basic screen of FIG. 6 will be explained in detail with reference to FIGS. 16 and 17.

The sort keybutton 225 is used to select a sheet discharge process. Namely, if the sort keybutton 225 is depressed, a sheet discharge process selection screen 720 shown in FIG. 16 is displayed.

On the sheet discharge process selection screen 720, a keybutton 721 is used to select a sort sheet discharge process, a keybutton 722 is used to select a group sheet discharge process, a keybutton 724 is used to select a sheet discharge process in which holes are punched on the sheet and then the punched sheet is discharged. A keybutton 725 is used to select a sheet discharge process in which the half of the sheet is folded into Z shape and then the folded sheet is discharged. A keybutton 723 is used to select a staple sort sheet discharge process. Namely, if the keybutton 723 is depressed, a staple position setting screen 730 shown in FIG. 17 is displayed.

Figure 17:
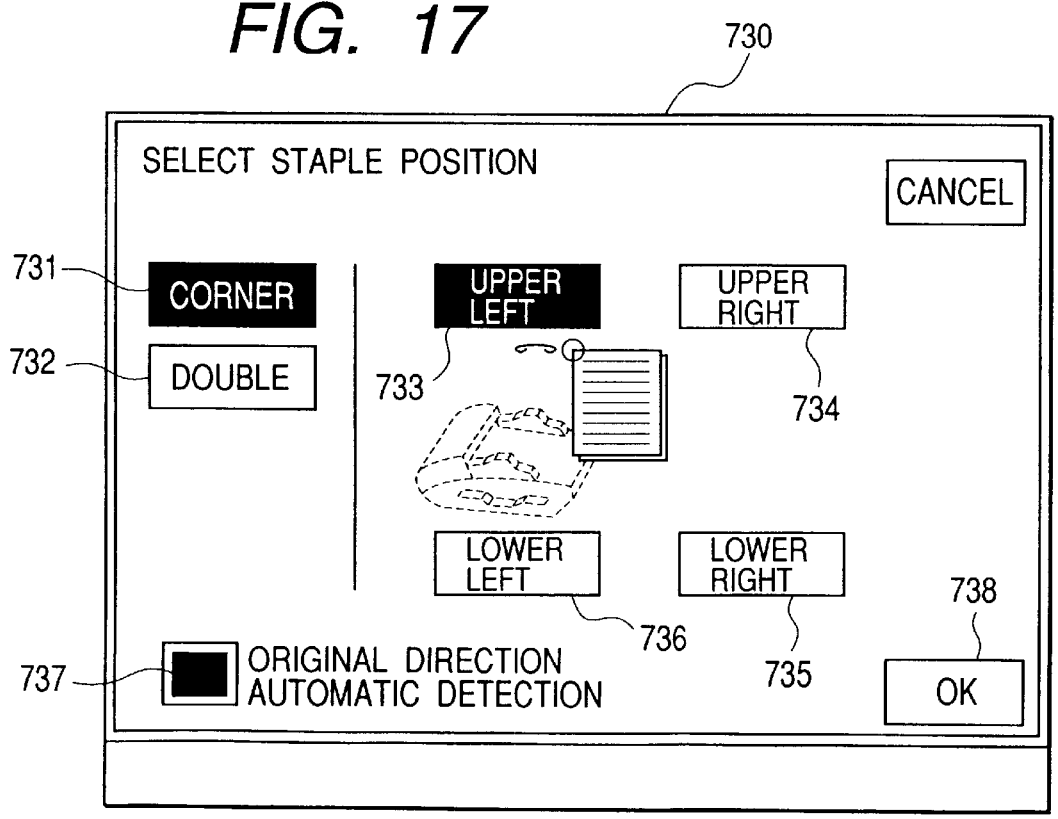
FIG. 17 is a view showing a staple position setting screen.

In FIG. 17, keybuttons 731 and 732 are used to select kinds of stapling. Namely, if the keybutton 731 is depressed, the setting is performed such that single stapling is performed at the corner of the sheet. Further, if the keybutton 732 is depressed, the setting is performed such that two-point stapling is performed at one edge of the sheet. Keybuttons 733 to 736 are used to set stapling positions. It is possible by a keybutton 737 to set whether or not the original direction detection function is to be used when the staple sorting is selected. If the keybutton 737 is depressed (i.e., turned on), the document direction on the original is detected when the original is read, and then it is controlled that the stapling is performed at the position selected by the keybuttons 733 to 736 with respect to the detected document direction. On the other hand, if the keybutton 737 is not depressed (i.e., off), the document direction on the original is not detected, and then it is controlled that the stapling is performed at the position selected by the keybuttons 733 to 736 with respect to the original direction.

[Operation in the Present Embodiment]

Hereinafter, the operation in the present embodiment will be explained with reference to FIGS. 18, 19 and 20.

Initially, judgment as to whether or not an ON/OFF switch of the original direction detection function is to be displayed when the setting of operation for each mode is performed will be explained with reference to the flow chart shown in FIG. 18.

Figure 18:
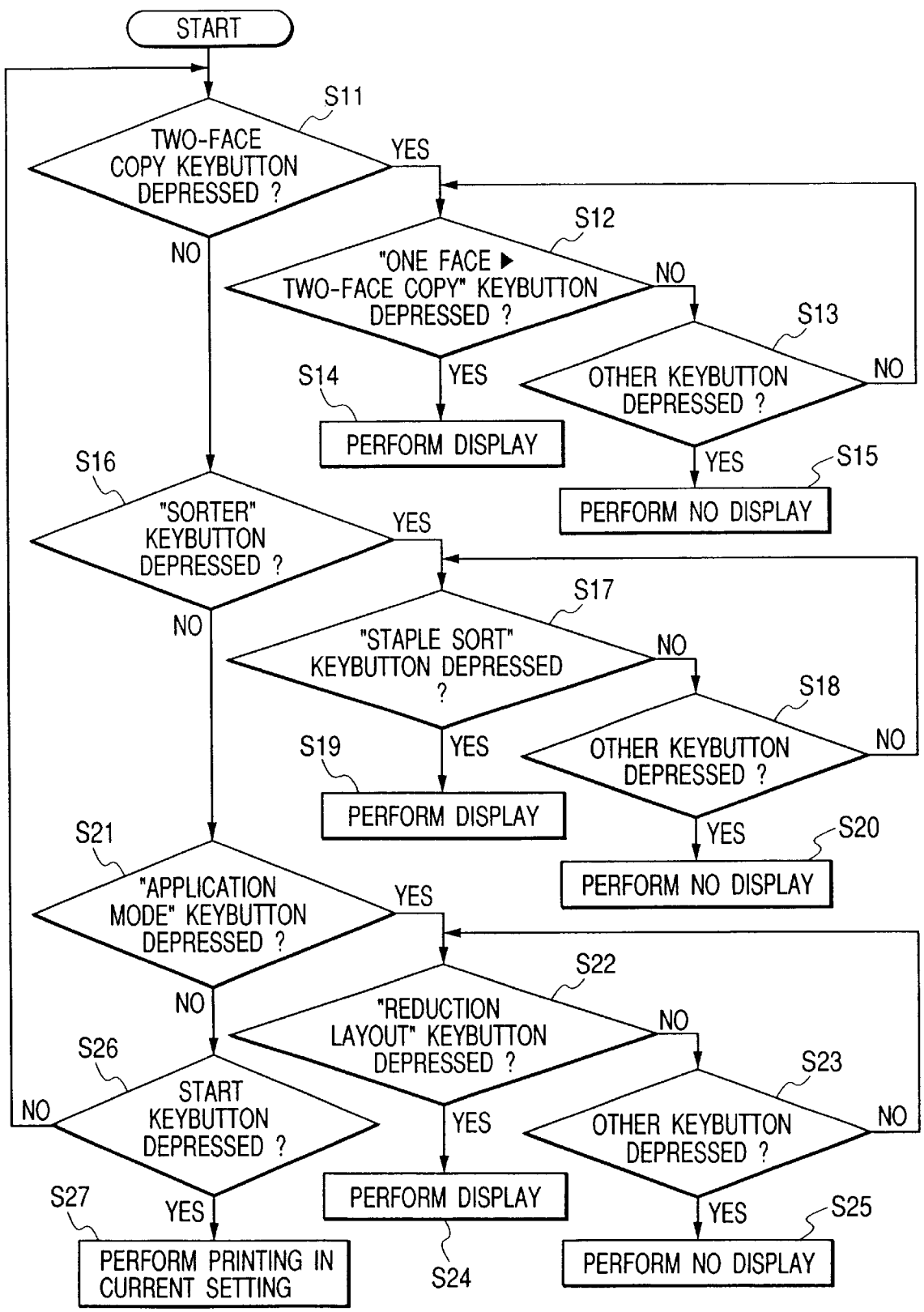
FIG. 18 is a flow chart showing a control operation according to the embodiment of the present invention.

In FIG. 18, initially it is judged in a step S11 whether or not the two-face printing keybutton 224 is depressed on the basic screen of FIG. 6. If judged that the keybutton 224 is depressed, the basic screen is changed to the two face mode setting screen of FIG. 7 and the like, and the flow advances to a step S12. On the other hand, if judged that the keybutton 224 is not depressed, the flow advances to a step S16 with the basic screen.

In the step S12, it is judged whether or not the one-face original→two-face printing keybutton 514 is depressed. If judged that the keybutton 514 is depressed, the flow advances to a step S13 to judge whether or not another keybutton is depressed. If judged in the step S13 that the page serial copy keybutton 517 is depressed, the original direction detection function is meaningless, the flow advances to a step S15 to perform the setting such that the original direction detection keybutton 524 is not displayed in a next setting screen. If the two-face original→one-face printing keybutton 515 or the two-face original→two-face printing keybutton 516 is depressed, the screen is changed (or returned) to the standard screen, whereby the original direction detection keybutton is not displayed.

If judged in the step S13 that any keybutton other than the keybutton 514 is not depressed, the flow returns to the step S12.

It is judged in the step S16 whether or not the sort keybutton 225 is depressed. If judged that the keybutton 225 is depressed, then the screen is changed to a sort setting screen (e.g., sheet discharge process selection screen 720) of FIG. 16 and the like, and the flow advances to a step S17. On the other hand, if judged in the step S16 that the sort keybutton 225 is not depressed, the flow advances to a step S21 with the basic screen.

It is judged in the step S17 whether or not the staple sort keybutton 723 is depressed. If judged that the keybutton 723 is depressed, the flow advances to a step S19 to perform the setting such that the original direction detection keybutton 737 is displayed. Thus, the original direction detection keybutton 737 is displayed on the next-displayed setting screen shown in FIG. 17. On the other hand, if judged in the step S17 that the keybutton 723 is not depressed, the flow advances to a step S18 to judge whether or not another keybutton is depressed.

If judged in the step S18 that the keybutton other than the staple sort keybutton 723 is depressed, the flow advances to a step S20 to perform the setting such that the original direction detection keybutton 737 is not displayed on a next screen. On the other hand, if judged in the step S18 that any keybutton other than the keybutton 723 is not depressed, the flow returns to the step S17.

It is judged in the step S21 whether or not the application keybutton 226 is depressed on the basic screen of FIG. 6. If judged that the keybutton 226 is depressed, then the screen is changed to the application setting screen shown in FIG. 11 and the like, and the flow advances to a step S22. On the other hand, if judged that the application keybutton 226 is not depressed, the flow advances to a step S26 with the basic screen.

It is judged in the step S22 whether or not the reduction layout keybutton 531 on the screen of FIG. 11 is depressed. If judged that the keybutton 531 is depressed, the flow advances to a step S24 to perform the setting such that the original direction detection keybutton is displayed. Thus, the original direction detection keybuttons 564 and 576 are displayed respectively on the setting screens of FIGS. 14 and 15.

On the other hand, if judged in the step S22 that the reduction layout keybutton 531 is not depressed, the flow advances to a step S23 to judge whether or not another keybutton is depressed.

If judged in the step S23 that the keybutton other than the reduction layout keybutton is depressed, the flow advances to a step S25 to perform the setting such that the original direction detection keybutton is not displayed. On the other hand, if judged that any keybutton other than the reduction layout keybutton is not depressed, the flow returns to the step S22.

It is judged in the step S26 whether or not the start keybutton 214 of the copying machine is depressed. If judged that the keybutton 214 is depressed, the flow advances to a step S27 to perform the printing with the current setting. On the other hand, if judged that the keybutton 214 is not depressed, the flow returns to the step S11.

As described above, according to the present embodiment, on the screen for setting the mode in which the original direction detection function can be effectively used, the setting is performed such that the original direction detection ON/OFF keybutton is displayed. Thus, the user can easily select effectiveness or ineffectiveness of the original direction detection function.

Subsequently, a control example of the screen on which the original direction detection keybutton is displayed.

Figure 19:
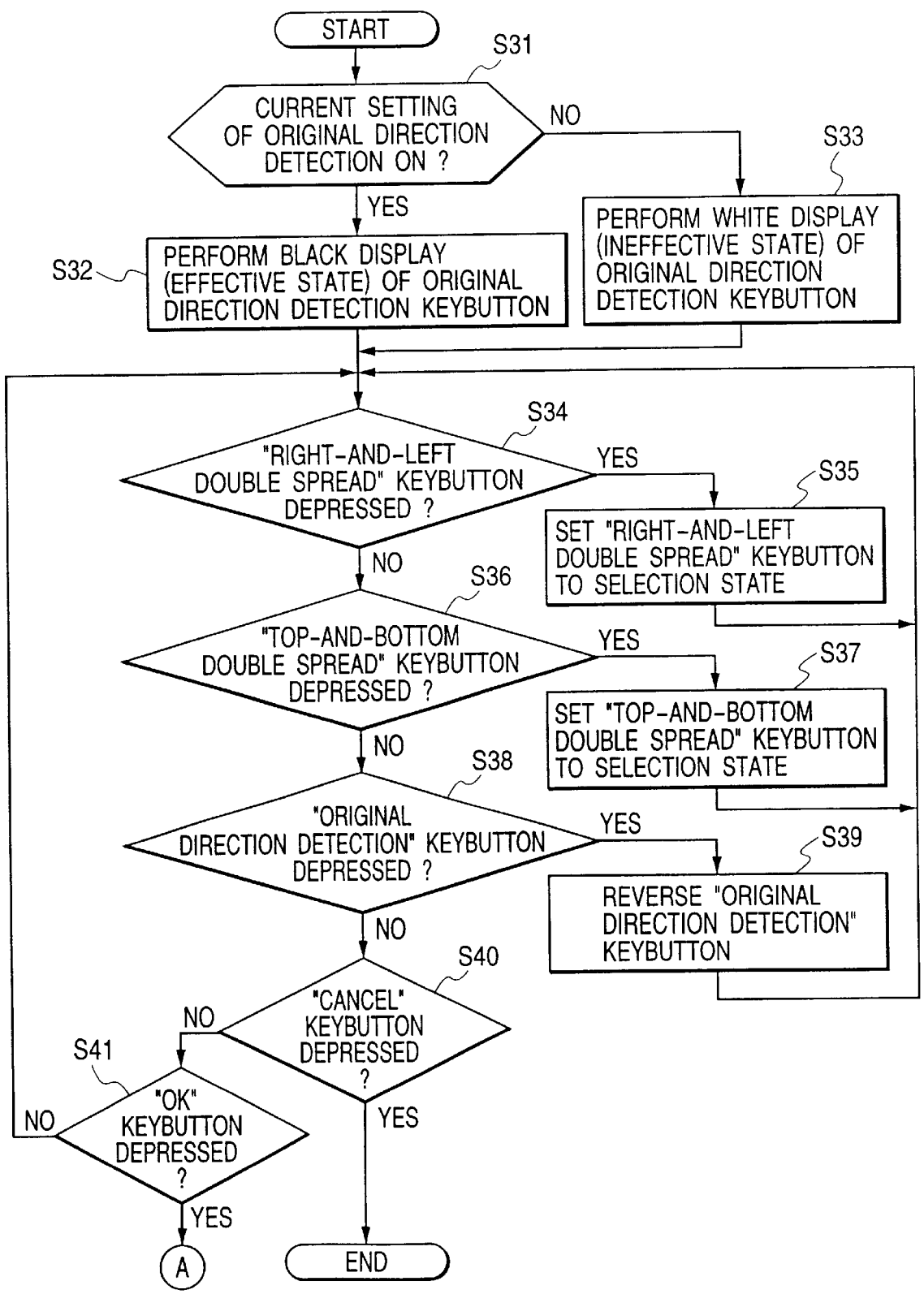
FIG. 19 is a flow chart showing a control operation according to the embodiment of the present invention.
Figure 20:
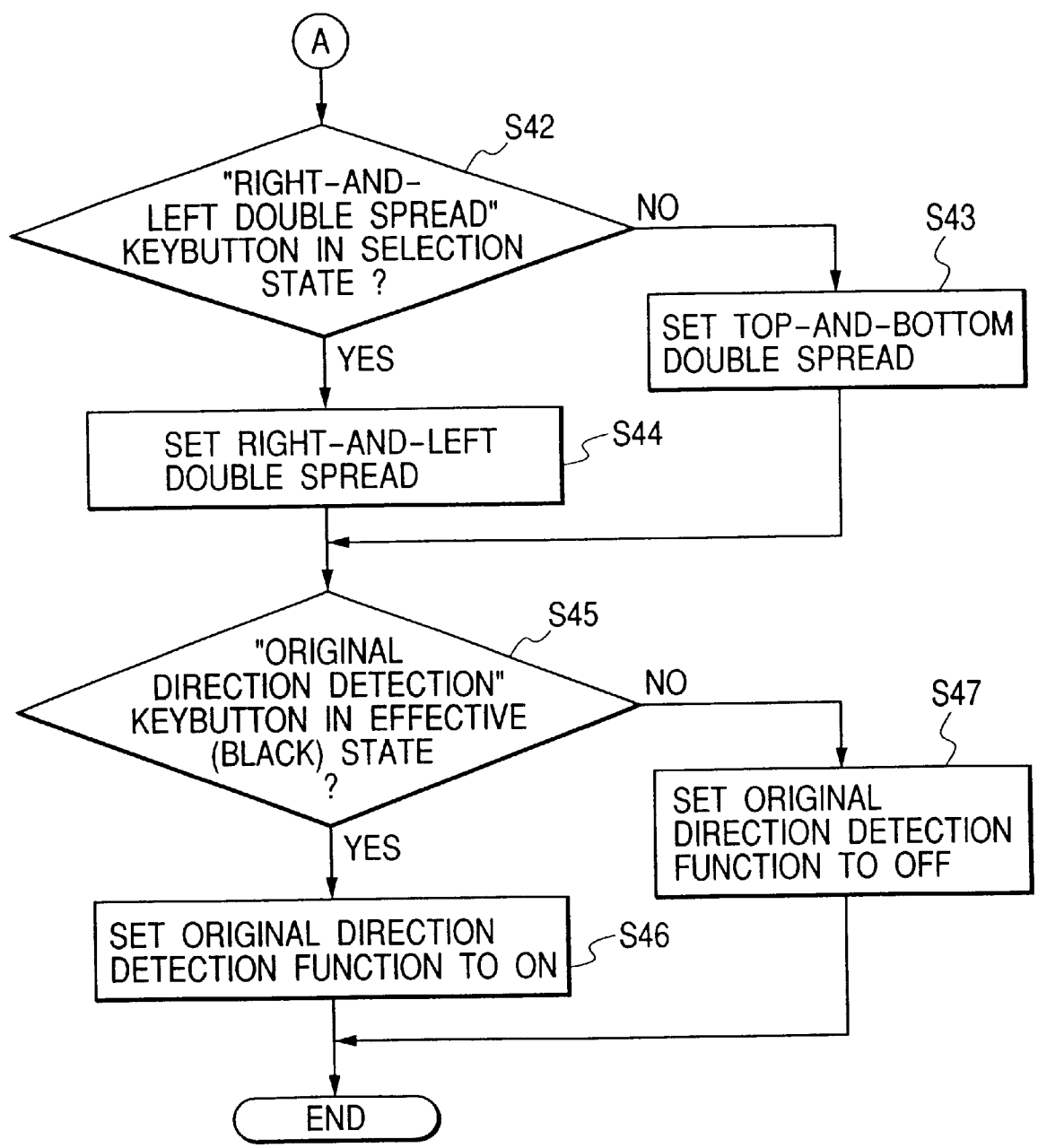
FIG. 20 is a flow chart showing the control operation subsequent to the operation shown in FIG. 19.

FIGS. 19 and 20 are flow charts of the control to be performed on the screen of FIG. 8.

As to such a set job, if ON/OFF of the original direction detection function has been previously selected in the other mode setting and the like, the setting at that time still remains as the current setting of the original direction detection function.

In FIG. 19, initially, it is judged in a step S31 whether the current original direction detection function is ON or OFF. If judged that the function is ON, the flow advances to a step S32 to display the original direction detection keybutton 524 in black (i.e., state representing effectiveness), and then the flow advances to a step S34.

On the other hand, if judged in the step S31 that the function is OFF, the flow advances to a step S33 to display the original direction detection keybutton 524 in white (i.e., state representing ineffectiveness), and then the flow advances to a step S34.

It is judged in the step S34 whether or not the right-and-left double spread setting keybutton 520 is depressed. If judged that the keybutton 520 is depressed, the flow advances to a step S35 to set the keybutton 520 to be in a selection state (black) (and setting top-and-bottom double spread setting keybutton 521 to be in non-selection state (white)). Then the flow returns to the step S34.

On the other hand, if judged in the step S34 that the keybutton 520 is not depressed, the flow advances to a step S36. It is judged in the step S36 whether or not the top-and-bottom double spread setting keybutton 521 is depressed. If judged that the keybutton 521 is depressed, the flow advances to a step S37 to set the keybutton 521 to be in a selection state (black) (and setting right-and-left double spread setting keybutton 520 to be in non-selection state (white)). Then the flow returns to the step S34. On the other hand, if judged in the step S36 that the keybutton 521 is not depressed, the flow advances to a step S38.

It is judged in the step S38 whether or not the original direction detection keybutton 524 is depressed. If judged that the keybutton 524 is depressed, the flow advances to a step S39 to invert the black/white state (i.e., effectiveness/ineffectiveness state) of the keybutton 524, and then the flow returns to the step S34. On the other hand, if judged in the step S38 that the keybutton 524 is not depressed, the flow advances to a step S40.

It is judged in the step S40 whether or not the cancel keybutton 522 is depressed. If judged that the keybutton 522 is depressed, the flow ends and the operation backs up one screen. It is judged in a step S41 whether or not the OK keybutton 523 is depressed. If judged that the OK keybutton 523 is not depressed, the flow returns to the step S34.

On the other hand, if judged in the step S41 that the OK keybutton 523 is depressed, the flow advances to a step S42 shown in FIG. 20 to further judge whether or not the right-and-left double spread setting keybutton 520 is in a selection state (black). If judged that the keybutton 520 is in the election state, the flow advances to a step S43 to set the top-and-bottom double spread. On the other hand, if judged that the right-and-left double spread is selected, the flow advances to a step S44 to set the right-and-left double spread, and the flow further advances to a step S45.

It is judged in the step S45 whether or not the original direction detection keybutton 524 is in an effective state (i.e., black). If judged that the keybutton 524 is in the effective state (black), the flow advances to a step S46 to set the original direction detection function to be ON. Then the flow ends, and the basic screen of the console unit 22 (FIG. 10, etc.) is again displayed.

On the other hand, if judged in the step S45 that the keybutton 524 is in an ineffective state (i.e., white), the flow advances to a step S47 to set the original direction detection function to be OFF. Then the flow ends, and the basic screen of the console unit 22 (FIG. 10, etc.) is again displayed.

As above, in the setting of one-face original→two-face printing mode, it is possible by the original direction detection keybutton to set effectiveness or ineffectiveness of the original direction detection function. Therefore, the user can easily use the original direction detection function.

The original direction detection function can be set in various modes. Further, even if the original direction detection function has been previously set, such the function can be again set such that the later setting antecedes the former setting.

In the present embodiment, only the one-face original→two-face printing mode has been explained. However, as to the screens of the other modes on which the original direction detection keybutton is displayed, it is similarly possible by the original direction detection keybutton to set whether or not the original direction detection function is to be used.

The present embodiment causes the original direction detection keybutton to appear in the stapling mode, the one-face original→two-face printing mode and the reduction layout mode. However, needless to say, the original direction detection keybutton may be displayed in another mode to which the original direction detection function is effective.

Figure 21:
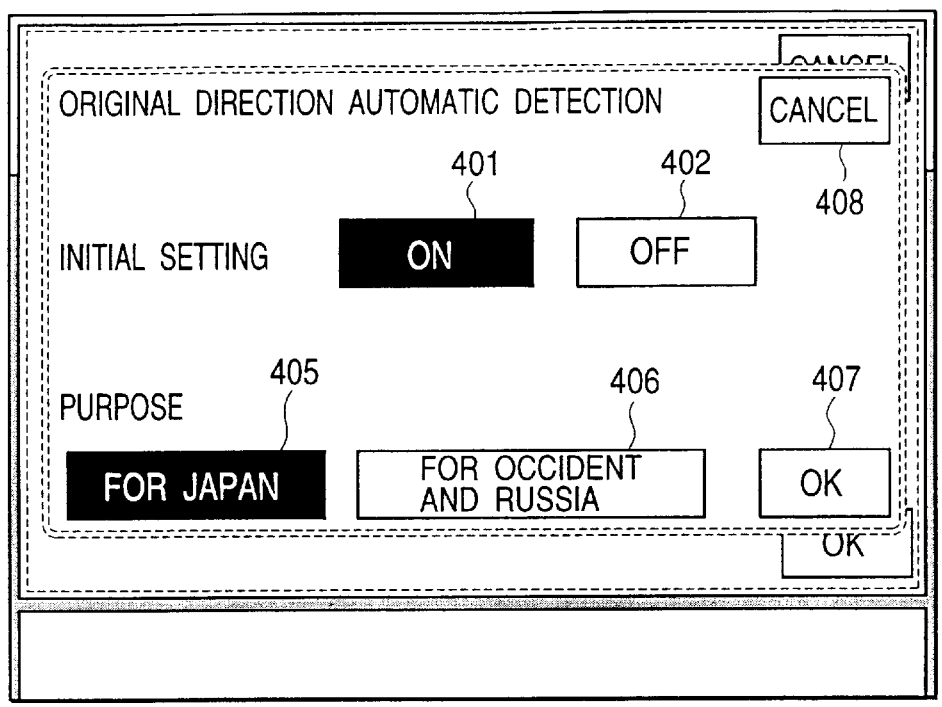
FIG. 21 is a view showing an initial setting screen of original direction automatic detection.

Subsequently, initial (or default) setting of the original direction automatic detection will be explained with reference to FIG. 21. FIG. 21 is a view showing an initial (or default) setting screen of the original direction automatic detection. This screen is selectively displayed by the user setting keybutton 218.

In FIG. 21, if a cancel keybutton 408 is depressed, the initial setting concerning the original direction detection and leading setting are not changed, and the initial setting screen is closed.

If an OK keybutton 407 is depressed, the initial setting and the leading setting are activated (i.e., setting to side of white characters on black background), and this screen is closed.

Numeral 401 denotes an initial setting ON keybutton, and numeral 402 denotes an initial setting OFF keybutton. These keybuttons 401 and 402 are in exclusive relation. Namely, if the keybutton 401 is depressed, the keybutton 401 is in the state of white characters on black background and the keybutton 402 is in the state of black character on white background. On the other hand, if the keybutton 402 is depressed, the keybutton 402 is in the state of white characters on black background and the keybutton 401 is in the state of black character on white background. In the embodiment, the keybutton in the state of white character on black background is called an active keybutton, while the keybutton in the state of black character on white background is called a negative keybutton.

In the initial setting, the original direction detection function is ON or OFF as default. If the keybutton 407 is depressed in the state that the ON keybutton 401 is active, the original direction detection function is ON as default. In the case where the original direction detection function is ON as default, if the user does not change the setting of the original direction automatic detection on the screen which is used to set the mode capable of using the original direction detection function (i.e., specific image formation mode) such as the printing setting, the two-face printing mode (FIG. 8), the reduction layout (FIGS. 14 and 15), the book binding mode, the stapling mode (FIG. 17), the binding margin mode or the like, the original direction automatic detection is performed (i.e., effective).

In the item of initial setting, if the keybutton 407 is depressed in the state that the OFF keybutton is active, the original direction detection function is OFF as default. In the case where the original direction detection function is OFF as default, if the user does not change the setting of the original direction automatic detection on the screen which is used to set the mode capable of using the original direction detection function such as the printing setting, the two-face printing mode, the reduction layout, the book binding mode, the stapling mode, the binding margin mode or the like, the original direction automatic detection is not performed (i.e., ineffective).

Numeral 405 denotes a purpose keybutton for Japan, and numeral 406 denotes a purpose keybutton for Occident and Russia. Also, these keybuttons 405 and 406 are in exclusive relation. If the purpose is set for Japan, characters included in the original image are processed as the Japanese language when the original direction automatic detection is performed. On the other hand, if the purpose is set for Occident and Russia, characters included in the original image are processed as romans or the like. However, the details of such processes are omitted in the present embodiment.

On the default setting screen shown in FIG. 21, if the keybutton 402 is selected, for example, the original direction automatic detection keybutton 564 is in an OFF (i.e., negative (white)) state on the setting screen of FIG. 14. In this state, if the keybutton 564 is depressed, a setting screen shown in FIG. 22 is displayed.

Figure 22:
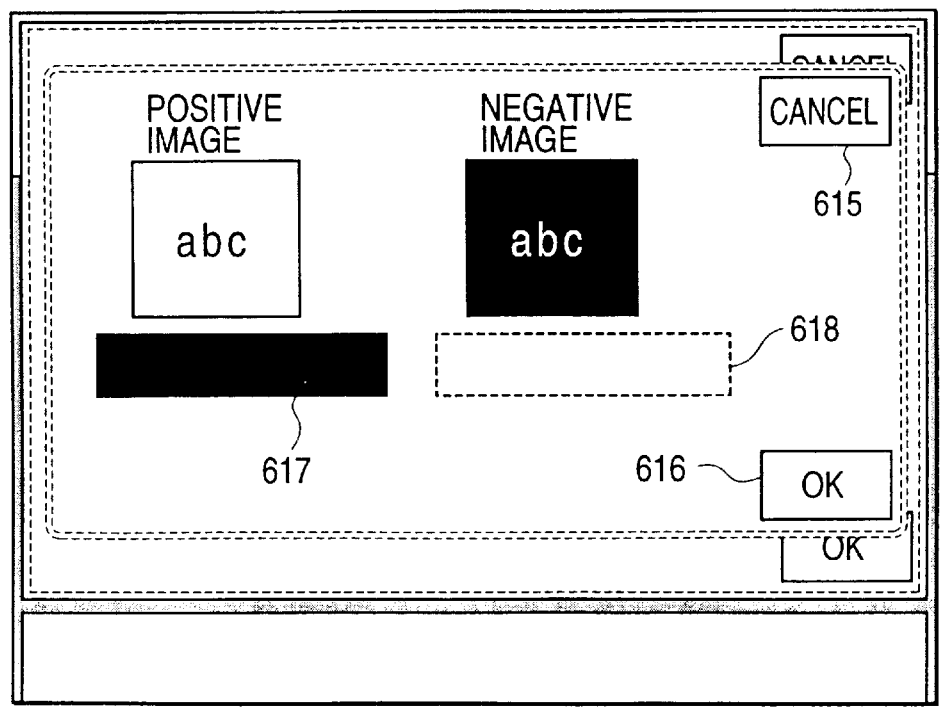
FIG. 22 is a view showing a negative/positive image setting screen.

On the setting screen of FIG. 22, it is set whether the original image is a negative image or a positive image.

If a cancel keybutton 615 is depressed, this setting screen is changed to the previous setting screen shown in FIG. 14.

If an original positive keybutton 617 is depressed, the positive image is activated. On the other hand, if an original negative keybutton 618 is depressed, the negative image is activated. It should be noted that the keybuttons 617 and 618 are exclusively activated. If an OK keybutton 618 is depressed, it is judged which of the keybuttons 617 and 618 is active. If the keybutton 617 is active, the original image is recognized as the positive image when the original direction is detected. On the other hand, if the keybutton 618 is active, the original image is recognized as the negative image, and then the screen is returned to the detail setting screen (FIG. 14). At this time, the original direction automatic detection keybutton 564 becomes active (i.e., black).

On the other hand, if the original direction automatic detection keybutton 564 is ON (i.e., active (black)), the setting screen of FIG. 22 is not displayed even if the OK keybutton 616 is depressed. Instead, the screen is returned to the setting screen shown in FIG. 13. In this case, the positive image is being set. However, after the keybutton 564 becomes negative (i.e., white) by depressing it, if the keybutton 564 is again depressed, the setting screen of FIG. 22 can be displayed.

By such a series of operations as above, in the case where there is no original direction detection as default, it is possible to perform the setting that the original direction is detected on the negative-image original in a 2-in-1 mode. Therefore, even in the negative image, it is possible to prevent that the original direction automatic detection is erroneously performed.

Figure 23:
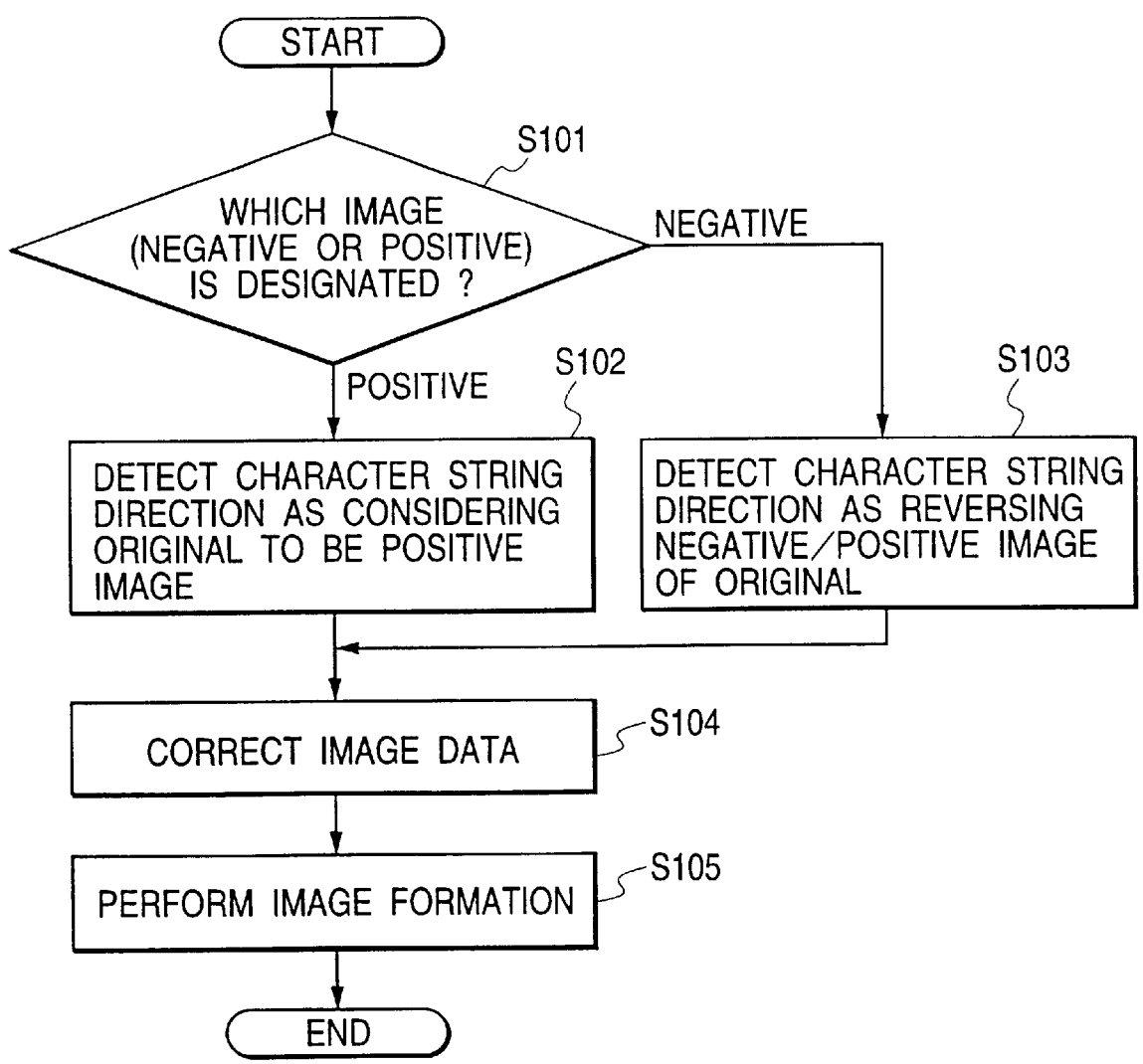
FIG. 23 is a flow chart showing an image process operation.

Hereinafter, the image process operations in negative and positive setting (designation) will be explained with reference to FIG. 23. FIG. 23 is a flow chart showing the image process operation according to the first embodiment. It should be noted that this operation is executed according to instructions of the CPU 21 on the basis of a program stored in the ROM 24.

Initially, it is judged in a step S101 which kind (i.e., negative or positive image) of the original has been set. If judged that the positive-image original has been set, the flow advances to a step S102. In this step, as the original is considered to be the positive image, character string direction detection (i.e., original direction automatic detection) is performed. On the other hand, if judged in the step S101 that the negative-image original has been set, the flow advances to a step S103. In this step, as the original is considered to be the negative-to-positive inverted image, the character string direction detection is performed.

In a step S104, the image data is subjected to a rotation process on the basis of the detected result. Then, in a step S105, the image formation is performed on the basis of the rotated (or corrected) image data.

The setting screen shown in FIG. 22 can be changed from the various setting screens on which the original direction automatic detection keybutton is displayed.

Figure 24:
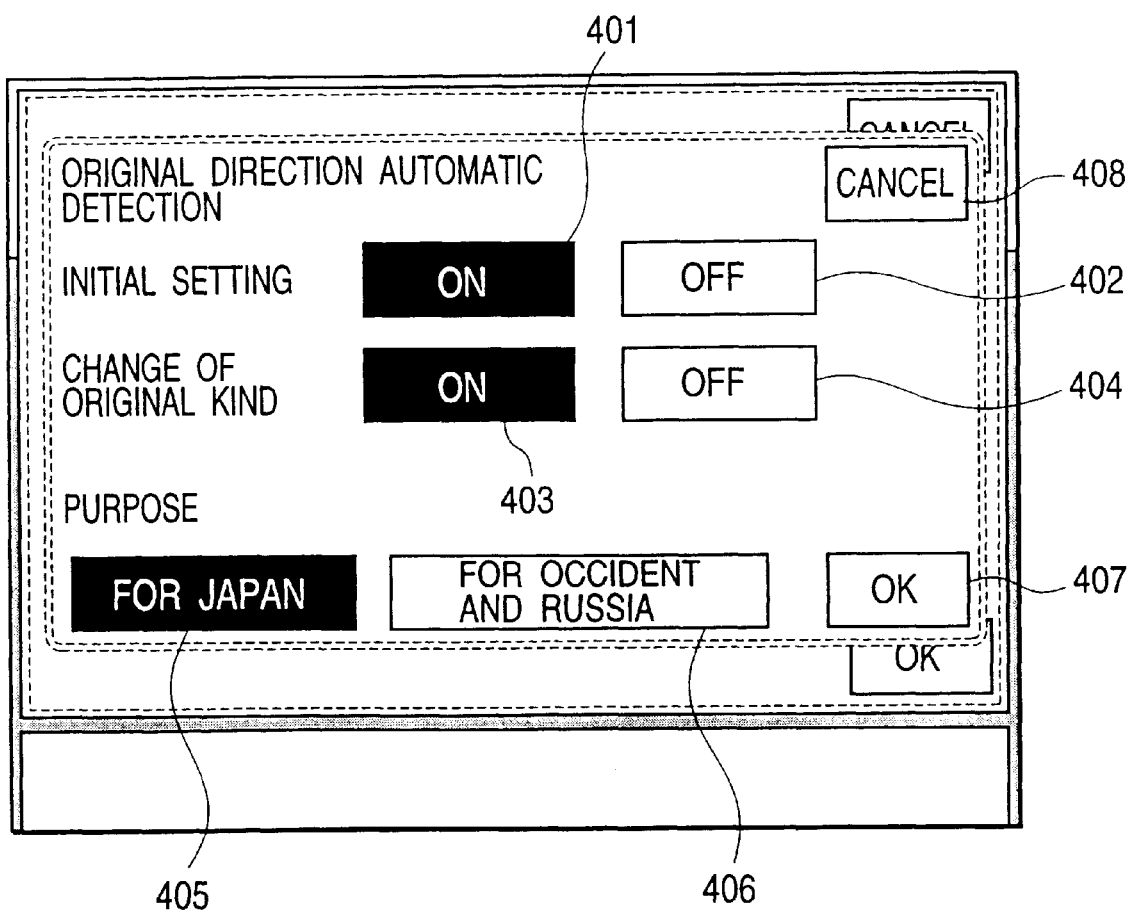
FIG. 24 is a view showing an initial setting screen of original direction automatic detection.

FIG. 24 is a view showing another example of a default setting screen of original direction automatic detection.

In the drawing, keybuttons 401, 402, 405 to 408 are the same as those on the setting screen shown in FIG. 21.

Numeral 403 denotes an original kind change ON keybutton, and numeral 404 denotes an original kind change OFF keybutton. Also, these keybuttons 403 and 404 are in exclusive relation. Original kind change is a process for setting, in a case where the user sets the original direction automatic detection, whether the original is the negative image (white characters on black background) or the positive image (black characters on white background). Such the setting is selectively performed by the keybuttons 403 and 404.

In a case where the ON keybutton 407 is depressed in the state that OK keybutton 403 is active, the original kind change is performed in the same manner as above. For example, on the setting screen shown in FIG. 14, when the setting is performed such that the original direction automatic detection function changes its state from negative to active, the setting screen shown in FIG. 22 is displayed, whereby the user performs the setting as to whether the original is the negative image or the active image.

In a case where the OFF keybutton 404 is depressed in the state that OK keybutton 407 is active, for example, on the setting screen shown in FIG. 14, when the setting is performed such that the original direction automatic detection function changes its state from negative to active, the setting screen shown in FIG. 22 is not displayed. Thus, the original direction detection is performed on the premise that the original is the positive image.

Figure 25:
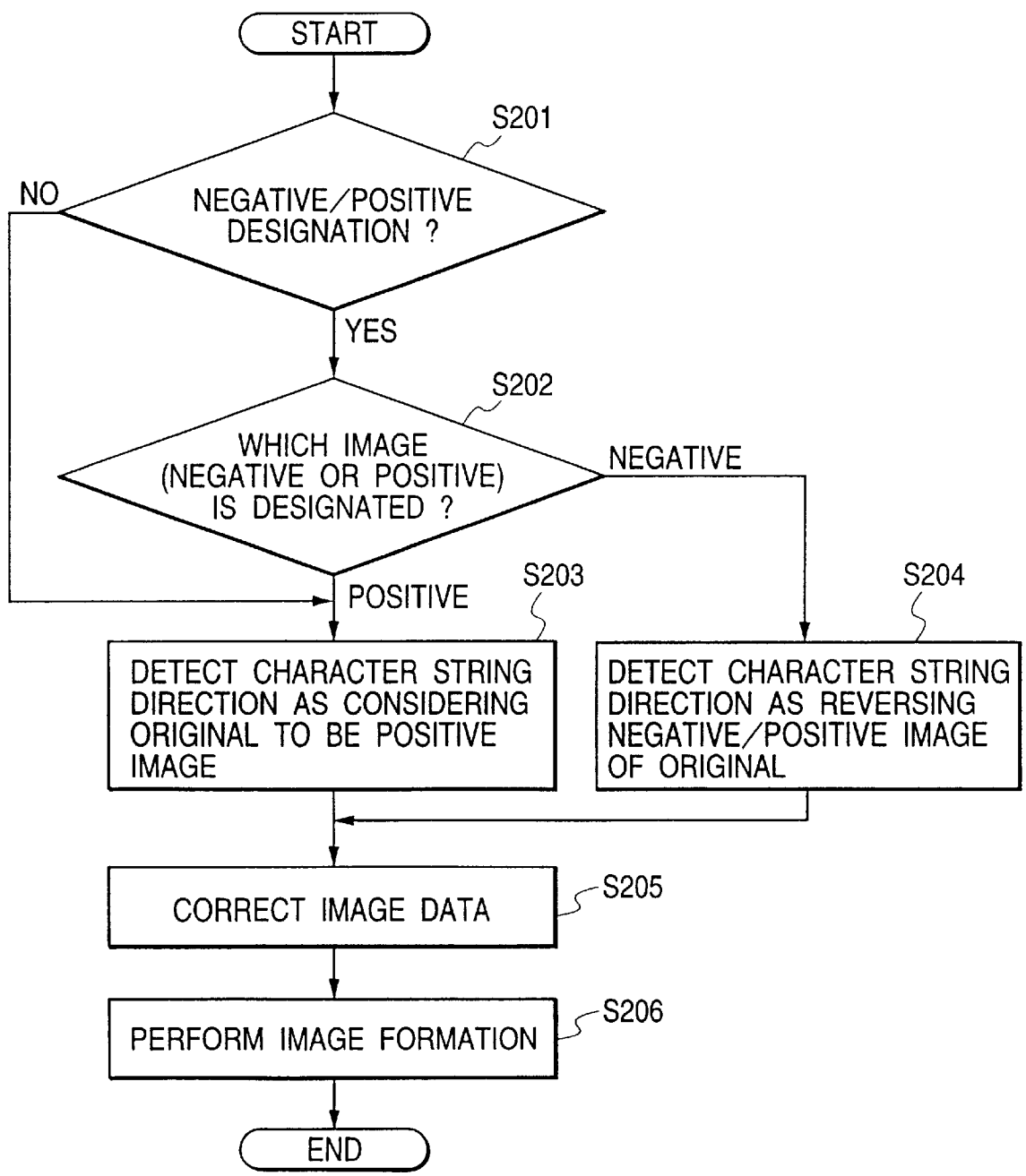
FIG. 25 is a flow chart showing an image process operation.

Hereinafter, the image process operation in case of the above negative/positive setting will be explained with reference to a flow chart shown in FIG. 25.

Initially, it is judged in a step S201 whether or not the setting to perform negative/positive setting (designation) has been performed. If judged that such the setting has been performed, the flow advances to a step S202 to display the setting screen shown in FIG. 22. On the screen, it is judged which of negative and positive images has been set. On the other hand, if the negative/positive setting is not performed, the setting screen shown in FIG. 22 is not displayed. Then the flow advances to a step S203 to detect the direction of character string (i.e., performing original direction automatic detection) on the premise that the original is the positive image.

The processes in steps S202 to S206 are the same as those in the steps S101 to S105 of FIG. 23, whereby the explanation thereof is omitted.

As above, according to the present embodiment, in the case where the original direction detection is set when the setting for the printing is performed, it is possible to select whether or not the screen for setting whether the original is the negative image or the positive image is to be displayed.

The user who sometimes uses the negative image can set displaying of the negative/positive setting screen so as to prevent erroneous detection. On the other hand, the user who always uses the positive-image original and dislikes complicated handling can set no displaying of the negative/positive setting screen. Thus, he can perform the original direction detection with simple handling.

In the above-described embodiment, the program according to each flow chart is stored in the storage unit (e.g., ROM 24) of the image formation apparatus, and the stored program is read and performed, whereby it is possible to realize the above control method.

The present invention is not limited to the above-described embodiment. That is, the present invention can be applied to a system constructed by plural equipments or can be also applied to an apparatus comprising one equipment. Needless to say, the present invention can be completed in a case where a memory medium storing the program codes of a software for realizing the functions of the above embodiment is supplied to a system or an apparatus and a computer (CPU or MPU) in the above system or apparatus reads and executes the program codes stored in the memory medium.

In such case the program codes themselves read from the memory medium realize the functions of the above embodiment, and the memory medium storing such program codes constitute the present invention. The memory medium storing such program codes can be, for example, a floppy disk, a hard disk, an optical disk, a magnetooptical disk, a CD-ROM, a CD-R, a magnetic tape, a non-volatile memory card. Needless to say, the present invention also includes, not only the case where the functions of the above embodiment are realized by the execution of the read program codes by the computer, a case where an operating system or the like functioning on the computer executes all the process or a part thereof according to the instructions of the program codes, thereby realizing the functions of the above embodiment.

Needless to say, the present invention further includes a case wherein the program codes read from the memory medium are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the above embodiment.

What is claimed is:

1. An image formation apparatus comprising:
   input means for inputting an image of an original;
   judgment means for judging a direction of the original image input by said input means;
   a touch panel display for displaying a setting screen including a key to set an image formation mode; and
   display control means for displaying, in a case where the image formation mode set on said touch panel display is an image formation mode for which to judge the original image direction is effective, an image direction judgment key used to instruct whether or not the original image direction is to be judged on the setting screen of the image formation mode.

2. An apparatus according to claim 1, further comprising process means for rotating, in a case where the image direction judgment key is on, the image input by said input means on the basis of the judgment result by said judgment means.

3. An apparatus according to claim 1, wherein the image formation mode for which to judge the original image direction is effective includes a mode to record images of one-face originals onto two faces of a sheet.

4. An apparatus according to claim 1, wherein the image formation mode for which to judge the original image direction is effective includes a mode to staple sheets.

5. An apparatus according to claim 1, wherein the image formation mode for which to judge the original image direction is effective includes a mode to arrange and record the images of the plural originals onto one sheet.

6. An apparatus according to claim 1, wherein, in a case where the image direction judgment key is on, said display control means displays the setting screen for designating whether the original image input by said input means is a negative image or a positive image.

7. An apparatus according to claim 6, wherein, in a case where it is designated that the input original image is the negative image, said judgment means judges the image direction after negative-to-positive inverting the input original image.

8. An apparatus according to claim 1, further comprising setting means for previously setting, in a case where the image formation mode for which to judge the original image direction is effective is set, whether the image direction judgment key is to be displayed in an on state or in an off state.

9. An image formation apparatus comprising:
   input means for inputting an image of an original;
   judgment means for judging a direction of the original image input by said input means;
   a touch panel display for displaying a setting screen including a key to set an image formation mode;
   display control means for displaying, on said touch panel display, a first key to input an instruction as to whether or not the direction of the original image is to be judged by said judgment means and a second key to designate whether the original image input by said input means is a negative image or a positive image; and
   setting means for previously setting whether or not the second key is to be displayed in response to the input of the first key.

10. An apparatus according to claim 9, wherein, in a case where it has been set by said setting means to display the second key, said display control means displays the second key in response to an operation that the first key is turned on from its off state.

11. An apparatus according to claim 9, wherein, in a case where it has been set by said setting means not to display the second key, said judgment means judges the image direction on the premise that the original input by said input means is the positive image.

12. An image formation apparatus comprising:
   judgment means for judging a direction of an image on an original;
   mode setting means for setting an image formation mode;
   an image direction judgment key for selecting whether or not said judgment means is to be operated; and
   key input control means for making, in a case where the image formation mode set by said mode setting means is an image formation mode which is influenced by the direction of the original image, effective the input of said image direction judgment key.

13. An apparatus according to claim 12, wherein the image formation mode which is influenced by the direction of the original image includes a mode to record images of one-face originals onto two faces of a sheet.

14. An apparatus according to claim 12, wherein the image formation mode which is influenced by the direction of the original image includes a mode to staple sheets.

15. An apparatus according to claim 12, wherein the image formation mode which is influenced by the direction of the original image includes a mode to arrange and record the images of the plural originals onto one sheet.

16. An apparatus according to claim 12, wherein said judgment means judges the direction of the image on the basis of a direction of a character included in the original image.

17. An apparatus according to claim 16, further comprising image kind selection means for selecting whether the original image is a negative image or a positive image, and wherein said judgment means uses a different judgment method in accordance with the selection result of said image kind selection means.

18. A control method for an image formation apparatus, comprising the steps of:

inputting an image of an original;

displaying a setting screen of a desired image formation mode on a touch panel display;

in a case where the set image formation mode is an image formation mode for which to judge an original image direction is effective, displaying an image direction judgment key used to instruct whether or not the original image direction is to be judged on the setting screen of said image formation mode; and in a case where the image direction judgment key is on, judging the direction of the original image input in said input step.

19. A method according to claim 18, further comprising the step of rotating the image input in said input step, on the basis of the judged result of said judgment step.

20. A method according to claim 18, wherein the image formation mode for which to judge the original image direction is effective includes a mode to record images of one-face originals onto two faces of a sheet.

21. A method according to claim 18, wherein the image formation mode for which to judge the original image direction is effective includes a mode to staple sheets.

22. A method according to claim 18, wherein the image formation mode for which to judge the original image direction is effective includes a mode to arrange and record the images of the plural originals onto one sheet.

23. A method according to claim 18, further comprising the step of displaying, in a case where the image direction judgment key is on, a setting screen for designating whether the original image input in said input step is a negative image or a positive image.

24. A method according to claim 23, wherein, in a case where it is designated that the input original image is the negative image, said judgment step judges the image direction after negative-to-positive inverting the original image input in said input step.

25. A method according to claim 18, further comprising the step of previously setting, in a case where the image formation mode for which to judge the original image direction is effective is set, whether the image direction judgment key is to be displayed in an on state or in an off state.

26. A control method for an image formation apparatus, comprising the steps of:

inputting an image of an original;

displaying a first key to input an instruction as to whether or not a direction of the original image is to be judged, on a touch panel display;

judging the direction of the original image input in said input step; and previously setting whether or not a second key to designate whether the original image input in said input step is a negative image or a positive image is to be displayed on the touch panel display in response to the input of the first key.

27. A method according to claim 26, further comprising the step of displaying, in a case where it is set in said setting step to display the second key, the second key in response to an operation that the first key is turned on from its off state.

28. A method according to claim 26, wherein, in a case where it is set in said setting step not to display the second key, said judgment step judges the image direction on the premise that the original input in said input step is the positive image.

29. A control method for an image formation apparatus, comprising:

setting an image formation mode;

making, in a case where the image formation mode set in said mode setting step is an image formation mode which is influenced by a direction of an original image, effective an input of an image direction judgment key for selecting whether or not the direction of the original image is to be judged;

judging the direction of the original image in accordance with the input of the image direction judgment key.

30. A method according to claim 29, wherein the image formation mode which is influenced by the direction of the original image includes a mode to record images of one-face originals onto two faces of a sheet.

31. A method according to claim 29, wherein the image formation mode which is influenced by the direction of the original image includes a mode to staple sheets.

32. A method according to claim 29, wherein the image formation mode which is influenced by the direction of the original image includes a mode to arrange and record the images of the plural originals onto one sheet.

33. A method according to claim 29, wherein said judgment step judges the direction of the image on the basis of a direction of a character included in the original image.

34. A method according to claim 33, further comprising the step of selecting whether the original image is a negative image or a positive image, and wherein said judgment step uses a different judgment method in accordance with the selection result of said selection step.

35. A computer-readable recording medium for storing a program to cause an image formation apparatus to execute the following steps of:

inputting an image of an original;

displaying a setting screen of a desired image formation mode on a touch panel display;

in a case where the set image formation mode is an image formation mode for which to judge an original image direction is effective, displaying an image direction judgment key for inputting an instruction as to whether or not the original image direction is to be judged, on the setting screen of the image formation mode; and in a case where the image direction judgment key is on, judging the direction of the original image input in said input step.

36. A medium according to claim 35, wherein the image formation mode which is influenced by the direction of the original image includes a mode to record images of one-face originals onto two faces of a sheet.

37. A medium according to claim 35, wherein the image formation mode which is influenced by the direction of the original image includes a mode to staple sheets.

38. A medium according to claim 35, wherein the image formation mode which is influenced by the direction of the original image includes a mode to arrange and record the images of the plural originals onto one sheet.

39. A medium according to claim 35, wherein said judgment step judges the direction of the image on the basis of a direction of a character included in the original image.

40. A medium according to claim 39, further comprising the step of selecting whether the original image is a negative image or a positive image, and wherein said judgment step uses a different judgment method in accordance with the selection result of said selection step.

* * * * *